US011716493B2

United States Patent
Tsukagoshi

(10) Patent No.: US 11,716,493 B2
(45) Date of Patent: *Aug. 1, 2023

(54) TRANSMISSION DEVICE, TRANSMISSION METHOD, RECEPTION DEVICE, RECEPTION METHOD, DISPLAY DEVICE, AND DISPLAY METHOD

(71) Applicant: SONY GROUP CORPORATION, Tokyo (JP)

(72) Inventor: Ikuo Tsukagoshi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/448,125

(22) Filed: Sep. 20, 2021

(65) Prior Publication Data

US 2022/0007063 A1 Jan. 6, 2022

Related U.S. Application Data

(63) Continuation of application No. 16/743,852, filed on Jan. 15, 2020, now Pat. No. 11,290,754, which is a (Continued)

(30) Foreign Application Priority Data

Feb. 7, 2014 (JP) .................................. 2014-022892

(51) Int. Cl.
*H04N 21/234* (2011.01)
*H04N 21/2343* (2011.01)
(Continued)

(52) U.S. Cl.
CPC ............ *H04N 21/234* (2013.01); *H04N 5/20* (2013.01); *H04N 9/68* (2013.01); *H04N 19/70* (2014.11);
(Continued)

(58) Field of Classification Search
CPC ............ H04N 21/234; H04N 21/2343; H04N 21/235; H04N 21/2389; H04N 21/435;
(Continued)

(56) References Cited

U.S. PATENT DOCUMENTS 9,736,507 B2 * 8/2017 Oh ..................... H04N 21/2362
2004/0196394 A1 10/2004 Nakajima
(Continued)

FOREIGN PATENT DOCUMENTS

CN 102696220 A 9/2012
CN 103430212 A 12/2013
(Continued)

OTHER PUBLICATIONS

Korean Notice of Allowance dated Oct. 2, 2021 in Korean Patent Application No. 10-2020-7026126, 2 pages.
(Continued)

*Primary Examiner* — Pinkal R Chokshi
(74) *Attorney, Agent, or Firm* — Oblon, McClelland, Maier & Neustadt, L.L.P.

(57) ABSTRACT

A transmission device including circuitry is provided. The circuitry is configured to apply photoelectric conversion characteristics to high dynamic range video data to obtain transmission video data. The circuitry is configured to transmit a container including a video stream obtained by encoding the transmission video data. The circuitry is configured to insert type information to designate the type of conversion characteristics corresponding to the applied photoelectric conversion characteristics for photoelectric conversion of the transmission video data into a layer of the video stream and/or a layer of the container. The type of the conversion characteristics designated by the type information is determined regardless of luminance of a display.

12 Claims, 21 Drawing Sheets

Related U.S. Application Data continuation of application No. 16/666,133, filed on Oct. 28, 2019, which is a continuation of application No. 16/231,371, filed on Dec. 21, 2018, now Pat. No. 11,418,820, which is a continuation of application No. 15/111,056, filed as application No. PCT/JP2015/050703 on Jan. 13, 2015, now Pat. No. 10,313,709.

(51) Int. Cl.
| | |
|---|---|
| H04N 21/435 | (2011.01) |
| H04N 21/81 | (2011.01) |
| H04N 21/84 | (2011.01) |
| H04N 5/20 | (2006.01) |
| H04N 9/68 | (2023.01) |
| H04N 21/2389 | (2011.01) |
| H04N 21/4402 | (2011.01) |
| H04N 19/70 | (2014.01) |
| H04N 21/235 | (2011.01) |
| H04N 21/438 | (2011.01) |

(52) U.S. Cl.
CPC ....... *H04N 21/235* (2013.01); *H04N 21/2343* (2013.01); *H04N 21/2389* (2013.01); *H04N 21/435* (2013.01); *H04N 21/4382* (2013.01); *H04N 21/4402* (2013.01); *H04N 21/816* (2013.01); *H04N 21/84* (2013.01)

(58) Field of Classification Search
CPC ........... H04N 21/4382; H04N 21/4402; H04N 21/816; H04N 21/84
See application file for complete search history.

(56) References Cited

U.S. PATENT DOCUMENTS

| | | |
|---|---|---|
| 2006/0018334 A1 | 1/2006 | Cho |
| 2007/0008575 A1 | 1/2007 | Yu et al. |
| 2007/0081721 A1 | 4/2007 | Xiao et al. |
| 2009/0067506 A1 | 3/2009 | Doser |
| 2009/0141178 A1 | 6/2009 | Kerofsky |
| 2009/0262114 A1 | 10/2009 | Park |
| 2010/0033515 A1 | 2/2010 | Kondo |
| 2011/0154426 A1 | 6/2011 | Doser et al. |
| 2011/0194618 A1 | 8/2011 | Gish |
| 2012/0224025 A1 | 9/2012 | Yu et al. |
| 2013/0148029 A1 | 6/2013 | Gish |
| 2013/0278721 A1 | 10/2013 | Broberg |
| 2014/0022460 A1 | 1/2014 | Li |
| 2014/0210647 A1 | 7/2014 | Knibbeler et al. |
| 2014/0225941 A1 | 8/2014 | Van Der Vleuten et al. |
| 2014/0341272 A1 | 11/2014 | Miller et al. |
| 2015/0036051 A1 | 2/2015 | Broberg |
| 2015/0042890 A1* | 2/2015 | Messmer ................. H04N 9/68 348/725 |
| 2015/0312591 A1 | 10/2015 | Takahashi et al. |
| 2015/0358617 A1* | 12/2015 | Sato ..................... H04N 19/105 382/166 |
| 2016/0173811 A1 | 6/2016 | Oh et al. |

FOREIGN PATENT DOCUMENTS

| | | |
|---|---|---|
| EP | 1734766 A2 | 12/2006 |
| JP | 2001309280 A | 11/2001 |
| JP | 2007-500459 A | 1/2007 |
| JP | 2007-067907 | 3/2007 |
| JP | 2012-501099 A | 1/2012 |
| JP | 2013106347 A | 5/2013 |
| JP | 2016111692 | 6/2016 |
| KR | 20040043418 A | 5/2004 |
| KR | 10-2007-0042138 A | 4/2007 |
| KR | 20110051946 A | 5/2011 |
| KR | 20120050745 A | 5/2012 |
| KR | 20160039477 A | 4/2016 |
| WO | 2007139534 A1 | 12/2007 |
| WO | 2010/021705 A1 | 2/2010 |
| WO | WO-2010024782 A1 | 3/2010 |
| WO | WO 2011/042229 A1 | 4/2011 |
| WO | WO-2012153224 A1 | 11/2012 |
| WO | 2013039730 A2 | 3/2013 |
| WO | 2013/046096 A1 | 4/2013 |
| WO | 2013/086169 | 6/2013 |
| WO | WO 2013/144809 A2 | 10/2013 |
| WO | 2014/002901 A1 | 1/2014 |
| WO | 2014002901 A | 1/2014 |

OTHER PUBLICATIONS

Japanese Office Action dated Feb. 18, 2020 in Japanese Patent Application No. 2019-075379, 5 pages.
European Office Action dated Nov. 20, 2019, in Patent Application No. 15 746 940.4, 8 pages.
Benjamin Bross, et al., "High Efficiency Video Coding (HEVC) text specification draft 10 (for FDIS & Consent)", Document JCTVC-L1003_v9, Joint Collaborative Team on Video Coding (JCT-VC) of ITU-T SG 16 WP 3 and ISO/IEC JTC 1/SC 29/WG 11, 12$^{th}$ Meeting, Jan. 14-23, 2013, (333 pages).
International Search Report dated Feb. 17, 2015 in PCT/JP2015/050703 filed Jan. 13, 2015.
Hattori S et al: "HLS: SEI message for Knee Function Information", 16. JCT-VC Meeting: Jan. 9, 2014-Jan. 17, 2014: San Jose: (Joint Collaborative Team on Video Coding of ISO/IEC JTC1/SC29/WG11 and ITU-T SG.16); URL: http://wftp3.itu.int/av-arch/jctvc-site/,No. JCTVC-P0050, Dec. 31, 2013 (Dec. 31, 2013), XP030115513.
Extended European Search Report dated Jul. 13, 2017 in Patent Application No. 15746940.4.
Office Action dated Sep. 25, 2018 in Japanese Patent Application No. 2015-560906.
Office Action dated Sep. 25, 2018 in Chinese Patent Application No. 201580006354.X (With English Translation) p. 1-18.
Office Action dated Dec. 11, 2018 in Japanese Patent Application No. 2015-560906.
Extended European Search Report dated Aug. 20, 2019 in corresponding European Patent Application No. 19187785.1, 9 pages.

* cited by examiner

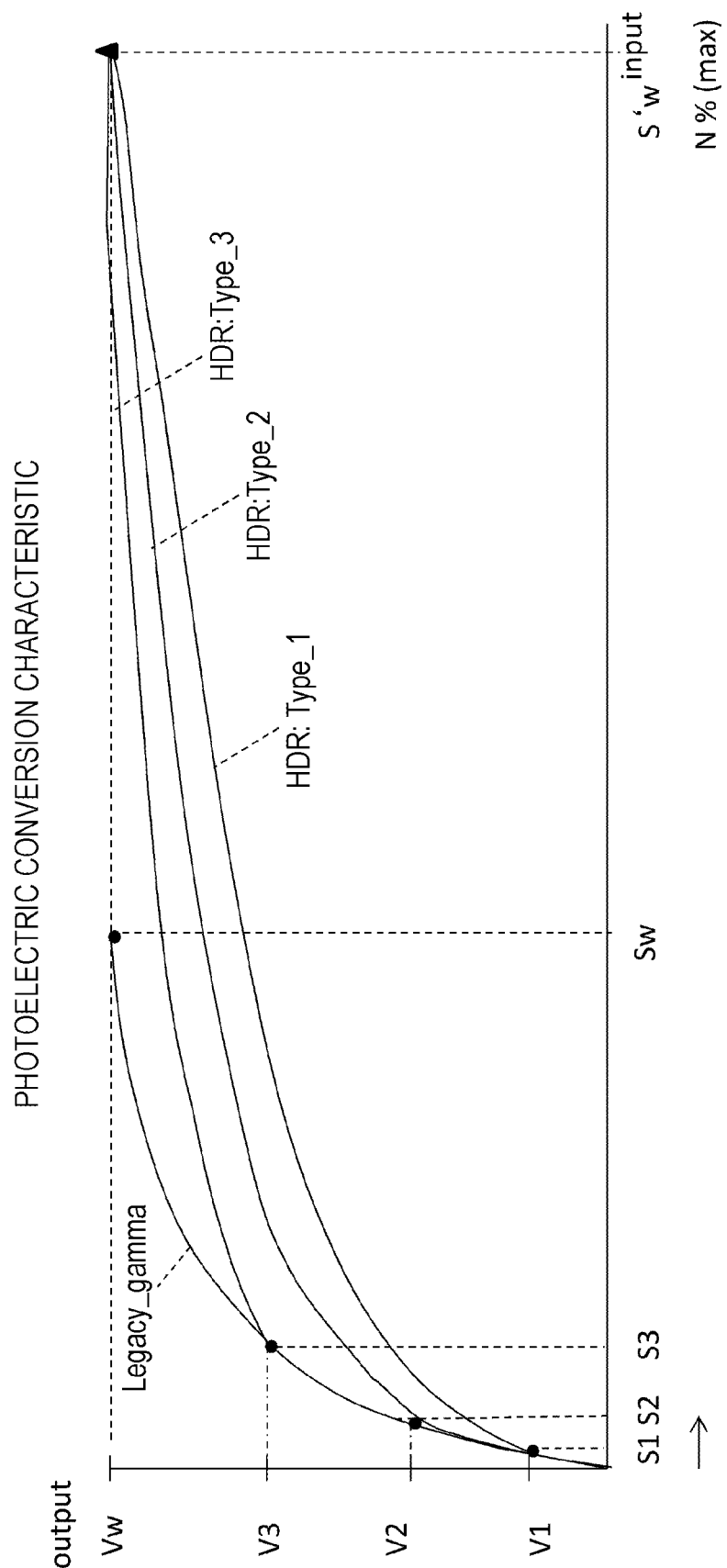

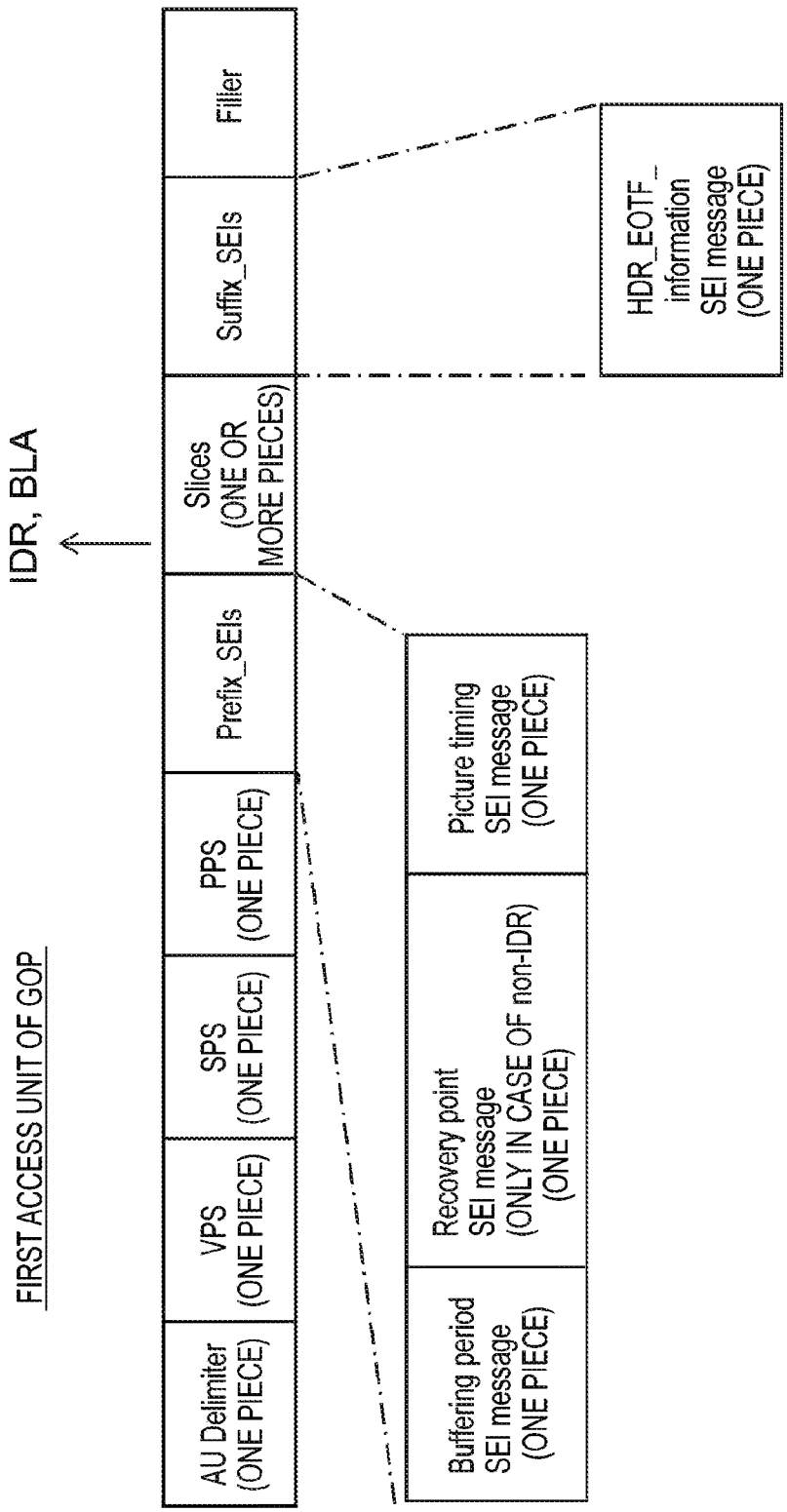

FIG. 5A

HDR EOTF information SEI Syntax

| Syntax | No. of Bits | Format |
|---|---|---|
| user_data_unregistered (size) { | | |
| uuid_iso_iec_11578 | 128 | uimsbf |
| for( i = 16; i < payloadSize; i++ ) | | |
| user_data_payload_byte | 8 | bslbf |
| } | | |

FIG. 5B

| Syntax | No. of Bits | Format |
|---|---|---|
| HDR_EOTF_information ( ) { | | |
| userdata_id | 16 | uimsbf |
| HDR_EOTF_information_length | 8 | uimsbf |
| HDR_EOTF_information_data() | | |
| } | | |

FIG. 6

Syntax of HDR EOTF Information SEI

| Syntax | No. of Bits | Format |
|---|---|---|
| HDR_EOTF_information_data() { | | |
|   uncompressed_peak_level | 16 | uimsbf |
|   eotf_flag | 1 | bslbf |
|   reserved | 7 | 0x3f |
|   if ( eotf_flag ) | 8 | bslbf |
|     eotf_type | 8 | |
|   else (){ | | uimsbf |
|     compressed_peak_level | 16 | uimsbf |
|     number_of_mapping_periods | 8 | uimsbf |
|     for ( j = 0; j < number_of_mapping_periods ; j++) { | | |
|       compressed_mapping_level | 16 | uimsbf |
|       uncompressed_mapping_level | 16 | uimsbf |
|     } | | |
|   } | | |
| } | | |

FIG. 7

HDR EOTF information SEI semantics uncompressed_peak_level
    PERCENTAGE VALUE (RELATIVE VALUE TO 100 cd/m²) OF MAXIMUM LEVEL OF SOURCE IMAGE DATA eotf_flag
    INDICATE WHETHER OR NOT ELECTRO-OPTICAL CONVERSION CHARACTERISTIC INFORMATION IS TYPE INFORMATION
    1   TYPE INFORMATION
    0   PARAMETER eotf_type
    INDICATE TYPE OF ELECTRO-OPTICAL CONVERSION CHARACTERISTIC compressed_peak_level
    PERCENTAGE VALUE (RELATIVE VALUE TO 100 cd/m²) OF MAXIMUM LEVEL OF ENCODED IMAGE DATA number_of_mapping_periods
    INDICATE NUMBER OF LINKED LEVEL MAPPING CURVES compressed_mapping_level
    INDICATE CHANGE POSITION OF LEVEL MAPPING CURVE AT LEVEL COMPRESSION AXIS USING PERCENTAGE VALUE
    IN WHICH compressed_peak_level IS SET TO 100% uncompressed_mapping_level
    INDICATE CHANGE POSITION OF LEVEL MAPPING CURVE AT LEVEL UNCOMPRESSION AXIS USING PERCENTAGE VALUE
    IN WHICH uncompressesed_peak_level IS SET TO 100%

FIG. 8

Syntax of HDR descriptor

| Syntax | No. of Bits | Format |
|---|---|---|
| HDR descriptor() { | | |
|   HDR descriptor_tag | 8 | uimslbf |
|   HDR descriptor_length | 8 | uimslbf |
|   uncompressed_peak_level | 16 | uimsbf |
|   eotf_flag | 1 | bslbf |
|   reserved | 7 | 0x3f |
|   if ( eotf_flag ) | 8 | bslbf |
|     eotf_type | 8 | |
|   else (){ | | uimsbf |
|     compressed_peak_level | 16 | uimsbf |
|     number_of_mapping_periods | 8 | uimsbf |
|     for ( j = 0; j < number_of_mapping_periods ; j++) { | | |
|       compressed_mapping_level | 16 | uimsbf |
|       uncompressed_mapping_level | 16 | uimsbf |
|     } | | |
|   } | | |
| } | | |

FIG. 11

Vendor Specific InfoFrame

| Packet Byte # | 7 | 6 | 5 | 4 | 3 | 2 | 1 | 0 |
|---|---|---|---|---|---|---|---|---|
| PB0 | Checksum ||||||||
| PB1 | 24bits IEEE Registration Identifier (0x000C03) ||||||||
| PB2 | (least significant byte first) ||||||||
| PB3 | |||||||| 
| PB4 | HDMI_Video_Format ||| Rsvd (0) | Rsvd (0) | Rsvd (0) | Rsvd (0) | Rsvd (0) |
| PB5 | 3D_Structure(4bits) |||| 3D_Meta _present (=0) | Rsvd (0) | Rsvd (0) | Rsvd (0) |
| PB6 | 3D_ext_data(4bits) |||| Rsvd (0) | Rsvd (0) | Rsvd (0) | Rsvd (0) |
| PB7 | Rsvd (0) | Rsvd (0) | Rsvd (0) | Rsvd (0) | Eotf_flag (=1) | Rsvd (0) | Rsvd (0) | Hdr_ INFOFLAG (=1) |
| PB8 | uncompressed_peak_level_MSByte ||||||||
| PB9 | uncompressed_peak_level_LSByte ||||||||
| PB10 | eotf_type ||||||||

FIG. 12

Vendor Specific InfoFrame

| Packet Byte # | 7 | 6 | 5 | 4 | 3 | 2 | 1 | 0 |
|---|---|---|---|---|---|---|---|---|
| PB0 | Checksum ||||||||
| PB1 | 24bits IEEE Registration Identifier (0x000C03) ||||||||
| PB2 | (least significant byte first) ||||||||
| PB3 |  ||||||||
| PB4 | HDMI_Video_Format ||| Rsvd (0) | Rsvd (0) | Rsvd (0) | Rsvd (0) | Rsvd (0) |
| PB5 | 3D_Structure(4bits) |||| 3D_Meta_present (=0) | Rsvd (0) | Rsvd (0) | Rsvd (0) |
| PB6 | 3D_ext_data(4bits) |||| Rsvd (0) | Rsvd (0) | Rsvd (0) | Hdr_INFOFLAG (=1) |
| PB7 | Rsvd (0) | Rsvd (0) | Rsvd (0) | Rsvd (0) | Eotf_flag (=0) | Rsvd (0) | Rsvd (0) | Rsvd (0) |
| PB8 | uncompressed_peak_level_MSByte ||||||||
| PB9 | uncompressed_peak_level_LSByte ||||||||
| PB10 | compressed_peak_level_MSByte ||||||||
| PB11 | compressed_peak_level_LSByte ||||||||
| PB12 | number_of_mapping_period ||||||||
| PB13 | compressed_mapping_level_MSByte ||||||||
| PB14 | compressed_mapping_level_LSByte ||||||||
| PB15 | uncompressed_mapping_level_MSByte ||||||||
| PB16 | uncompressed_mapping_level_LSByte ||||||||
| .. | ... ||||||||

FIG. 19

- High Dynamic Range RELATION service_video:high_dynamic_range:   /*INDICATE WHETHER OR NOT VIDEO DISPLAY IS high dynamic range */
  "0"        VIDEO DISPLAY IS NOT high dynamic range
  "1"        VIDEO DISPLAY IS high dynamic range service_video:high_dynamic_range:eotf_compatible:
  "0"        IS compatible HDR AND HAS PARTIAL COMPATIBILITY WITH legacy gamma
  "1"        IS non-compatible HDR AND HAS NO COMPATIBILITY WITH legacy gamma
  "2"        IS gamma service_video:high_dynamic_range:eotf_type:
  type_1     /* DIAGRAM OF ELECTRO-OPTICAL CONVERSION CHARACTERISTIC */
  type_2     /* DIAGRAM OF ELECTRO-OPTICAL CONVERSION CHARACTERISTIC */
  type_3     /* DIAGRAM OF ELECTRO-OPTICAL CONVERSION CHARACTERISTIC */ service_video:high_dynamic_range:compressed_peak_level:
  < unsigned 16bit value > service_video:high_dynamic_range:number_of_mapping_periods:
  < unsigned 8bit value > service_video:high_dynamic_range:compressed_mapping_level:
  < unsigned 16bit value > service_video:high_dynamic_range:uncompressed_mapping_level:
  < unsigned 16bit value >

FIG. 20

```
<MPD
    xmlns:xsi="http://www.w3.org/2001/XMLSchema-instance"
    xmlns="urn:mpeg:DASH:schema:MPD:2011"
    xsi:schemaLocation="urn:mpeg:DASH:schema:MPD:2011 DASH-MPD.xsd"
    type="static"
    mediaPresentationDuration="PT3256S"
    minBufferTime="PT1.2S"
    profiles="urn:mpeg:dash:profile:isoff-on-demand:2011">
    <BaseURL>http://cdn1.example.com/</BaseURL>    /* url INDICATING LINK OF video CONTAINER */
    <BaseURL>http://cdn2.example.com/</BaseURL>
    <!-- In this Period the SVC stream is split into three representations -->
    <Period>
        <AdaptationSet>
            service_video:high_dynamic_range:< 1 >
            service_video:high_dynamic_range:eotf_compatible: < 0 >
            service_video:high_dynamic_range:eotf_type: <1>
            service_video:high_dynamic_range:compressed_peak_level: <300>
            service_video:high_dynamic_range:number_of_mapping_periods: <2>
            service_video:high_dynamic_range:compressed_mapping_level :< >
            service_video:high_dynamic_range:uncompressed_mapping_level :< > minBandwidth="512000"
            maxBandwidth="1024000"
            width="3840"
            height="2160"
            frameRate="60"
            lang="en">
            <!-- Independent Representation -->
            <Representation
                mimeType="video/mp4"
                codecs="avc1.4D401E,mp4a.0x40"
                id="tag5"
                bandwidth="512000">
                <BaseURL>video-512k.mp4</BaseURL>
                <SegmentBase indexRange="0-4332"/>
            </Representation>
```

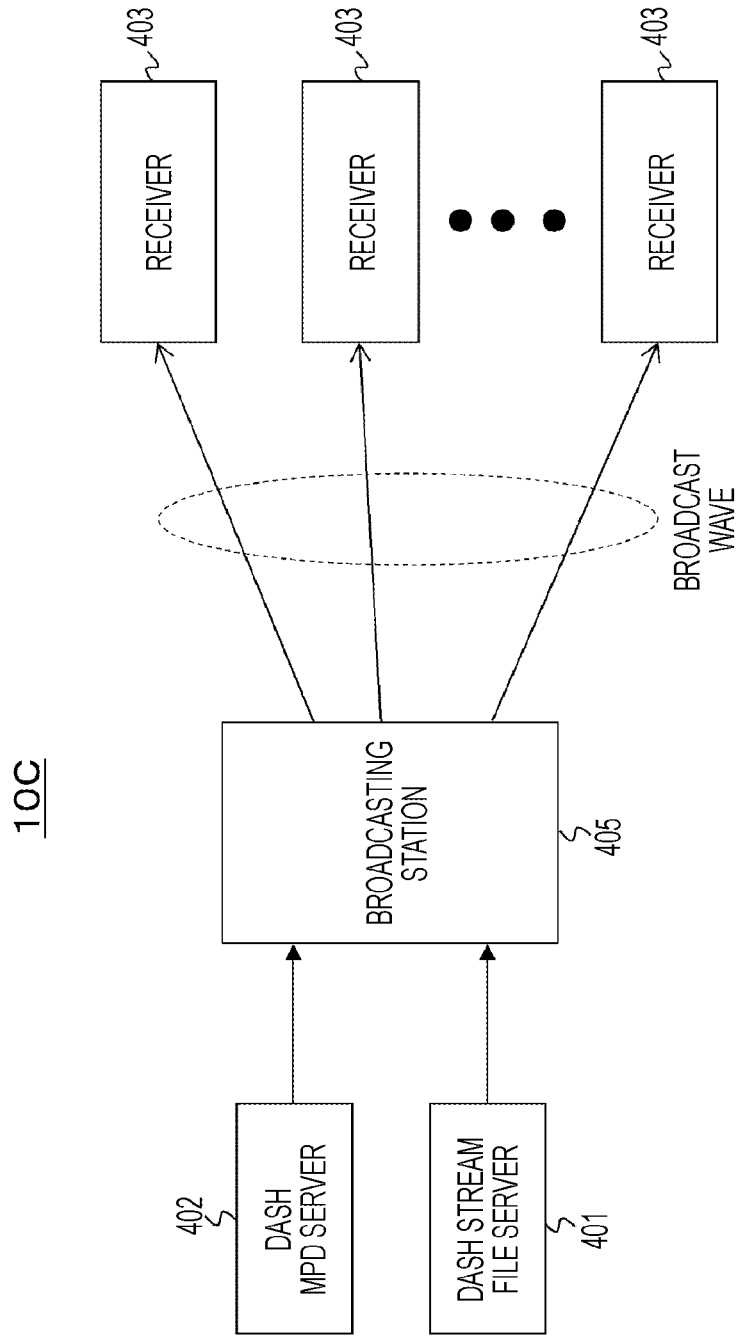

TRANSMISSION DEVICE, TRANSMISSION METHOD, RECEPTION DEVICE, RECEPTION METHOD, DISPLAY DEVICE, AND DISPLAY METHOD

CROSS-REFERENCE TO RELATED APPLICATIONS

This application is a continuation of U.S. Ser. No. 16/743,852 filed Jan. 15, 2020, which is a continuation of U.S. Ser. No. 16/666,133 filed Oct. 28, 2019, which is a continuation of U.S. Ser. No. 16/231,371 filed Dec. 21, 2018, which is a continuation of U.S. Ser. No. 15/111,056 filed Jul. 12, 2016, which is now U.S. Pat. No. 10,313,709 issued Jun. 4, 2019, the entire content of which are incorporated herein by reference. U.S. Ser. No. 15/111,056 is a national stage of PCT/JP2015/050703 filed Jan. 13, 2015, and also claims priority under 35 U.S.C. 119 to Japanese Application No. 2014-022892 filed Feb. 7, 2014. The benefit of priority is claimed to each of the foregoing, and the entire contents of each of the foregoing are incorporated herein by reference.

TECHNICAL FIELD

The present technology relates to a transmission device, a transmission method, a reception device, a reception method, a display device, and a display method, and more particularly, for example, to a transmission device capable of performing photoelectric conversion on video data of a high dynamic range, compressing a level range, and transmitting resulting data.

BACKGROUND ART

In the past, gamma correction of correcting a gamma characteristic of a monitor by receiving data having an opposite characteristic to a characteristic of a monitor is known. For example, Non-Patent Document 1 discloses a technique of transmitting a video stream generated by encoding transmission video data obtained by applying photoelectric conversion on high dynamic range (HDR) video data having a level of 0 to 100%*N (N is larger than 1).

CITATION LIST

Non-Patent Document

Non-Patent Document 1: High Efficiency Video Coding (HEVC) text specification draft 10 (for FDIS & Last Call)

SUMMARY OF THE INVENTION

Problems to be Solved by the Invention

If a range having compatibility with a photoelectric conversion characteristic of the related art is increased, a range in which HDR effects are obtained is reduced. On the other hand, in photoelectric conversion characteristic applied to the HDR video data, if the range in which HDR effects are obtained is increased, the range having compatibility with a photoelectric conversion characteristic of the related art is reduced. As described above, in the single photoelectric conversion characteristic, it is hard to satisfy compatibility with the related art and abundant expression performance of the HDR at the same time. Meanwhile, generally, a demand for a gradation of an HDR image differs according to each image.

It is an object of the present technology to provide a technique capable of performing appropriate photoelectric conversion on HDR video data according to image content and transmitting resulting data.

Solutions to Problems

A concept of the present technology lies in
a transmission device, including:
a processing unit that performs photoelectric conversion on input video data having a level range of 0% to 100%*N (N is a number larger than 1), and obtains transmission video data;
a transmission unit that transmits a container including a video stream obtained by encoding the transmission video data; and
an information insertion unit that inserts information of an electro-optical conversion characteristic of each predetermined unit of the transmission video data into a layer of the video stream and/or a layer of the container.

In the present technology, a processing unit performs photoelectric conversion on input video data having a level range of 0% to 100%*N (N is a number larger than 1), and obtains transmission video data. A transmission unit transmits a container including a video stream obtained by encoding the transmission video data. For example, the container may be a transport stream (MPEG-2 TS) employed by a digital broadcasting standard. Further, for example, the container may be an MP4 used in delivery via the Internet or the like or a container of any other format.

An information insertion unit inserts information of an electro-optical conversion characteristic of each predetermined unit of the transmission video data into a layer of the video stream and/or a layer of the container. For example, a predetermined unit may be a scene unit or a program unit. Further, for example, the electro-optical conversion characteristic information may be type information designating a type of electro-optical conversion characteristic. Further, for example, the electro-optical conversion characteristic information may be a parameter for obtaining a curve of the electro-optical conversion characteristic.

As described above, in the present technology, the information of the electro-optical conversion characteristic of each predetermined unit of the transmission video data is inserted into the layer of the video stream and/or the layer of the container. Thus, it is possible to perform the photoelectric conversion on the HDR video data in predetermined units by selectively applying the appropriate photoelectric conversion characteristic according to the image content and transmit the resulting data.

Further, another concept of the present technology lies in
a reception device, including:
a reception unit that receives a container of a predetermined format including a video stream obtained by encoding transmission video data,
the transmission video data being obtained by performing photoelectric conversion on input video data having a level range of 0% to 100%*N (N is a number larger than 1),
information of an electro-optical conversion characteristic of each predetermined unit of the transmission video data being inserted into a layer of the video stream and/or a layer of the container; and
a processing unit that processes the video stream included in the container received by the reception unit.

In the present technology, a reception unit receives a container of a predetermined format including a video stream obtained by encoding transmission video data. The transmission video data is obtained by performing photoelectric conversion on input video data having a level range of 0% to 100%*N (N is a number larger than 1). Further, information of an electro-optical conversion characteristic of each predetermined unit of the transmission video data is inserted into a layer of the video stream and/or a layer of the container. A processing unit processes the video stream included in the container received by the reception unit.

For example, the processing unit may include a decoding unit that decodes the video stream and obtains the transmission video data and an electro-optical conversion unit that performs electro-optical conversion on the transmission video data obtained by the decoding unit based on information of the electro-optical conversion characteristic of each predetermined unit, and obtains output video data. Thus, it is possible to reproduce the HDR video data that does not undergo the photoelectric conversion at the transmission side and display the HDR image excellently.

In this case, for example, the electro-optical conversion characteristic information may be type information designating a type of the electro-optical conversion characteristic, and the electro-optical conversion unit may perform electro-optical conversion on the transmission video data based on a curve of the electro-optical conversion characteristic of the type designated by the type information. Further, in this case, for example, the electro-optical conversion characteristic information may be a parameter for obtaining a curve of the electro-optical conversion characteristic, and the electro-optical conversion unit may perform electro-optical conversion on the transmission video data based on the curve of the electro-optical conversion characteristic obtained by the parameter.

In this case, for example, the curve of the electro-optical conversion characteristic used by the electro-optical conversion unit may be obtained based on the parameter and maximum display level information, and a maximum level of the output video data may be limited to the maximum display level information. Thus, it is possible to display the HDR image excellently without incurring white collapse and the like in the display unit (display).

Further, the processing unit may include a decoding unit that decodes the video stream included in the container, and obtains the transmission video data and a transmission unit that transmits the transmission video data obtained by the decoding unit and the electro-optical conversion characteristic information of each predetermined unit of the transmission video data to an external device in association with each other. Thus, the external device can perform the electro-optical conversion on the transmission video data based on the information of the electro-optical conversion characteristic of each predetermined unit, reproduce the HDR video data that does not undergo the electro-optical conversion at the transmission side, and excellently display the HDR image.

In this case, for example, the transmission unit may transmit the transmission video data to the external device through a differential signal using a predetermined number of channels, and may insert information of the electro-optical conversion characteristic into a blanking period of the transmission video data and may transmit the electro-optical conversion characteristic information to the external device.

Further, another concept of the present technology lies in a display device, including:
a reception unit that receives transmission video data and information of an electro-optical conversion characteristic of each predetermined unit of the transmission video data associated with the transmission video data from an external device; and
an electro-optical conversion unit that performs electro-optical conversion on the transmission video data received by the reception unit based on the information of the electro-optical conversion characteristic of each predetermined unit, and obtains output video data.

In the present technology, a reception unit receives transmission video data and information of an electro-optical conversion characteristic of each predetermined unit of the transmission video data associated with the transmission video data from an external device. An electro-optical conversion unit performs electro-optical conversion on the transmission video data received by the reception unit based on the information of the electro-optical conversion characteristic of each predetermined unit, and obtains output video data. Thus, it is possible to reproduce the HDR video data that does not undergo the electro-optical conversion and excellently display the HDR image.

In this case, for example, the electro-optical conversion characteristic information may be type information designating a type of the electro-optical conversion characteristic, and the electro-optical conversion unit may perform electro-optical conversion on the transmission video data based on a curve of the electro-optical conversion characteristic of the type designated by the type information. Further, in this case, for example, the electro-optical conversion characteristic information may be a parameter for obtaining a curve of the electro-optical conversion characteristic, and the electro-optical conversion unit may perform electro-optical conversion on the transmission video data based on the curve of the electro-optical conversion characteristic obtained by the parameter.

In this case, for example, the curve of the electro-optical conversion characteristic used by the electro-optical conversion unit may be obtained based on the parameter and maximum display level information, and a maximum level of the output video data may be limited to the maximum display level information. Thus, it is possible to display the HDR image excellently without incurring white collapse and the like in the display unit (display).

Further, another concept of the present technology lies in a transmission device, including:
a first transmission unit that transmits a container including a video stream including encoded data of transmission video data obtained by performing photoelectric conversion on input video data having a level range of 0% to 100%*N (N is a number larger than 1); and
a second transmission unit that transmits a metafile including information for enabling a reception side to acquire the video stream,
wherein information of an electro-optical conversion characteristic of each predetermined unit of the transmission video data is inserted into the video stream and/or the metafile.

In the present technology, a first transmission unit transmits a container including a video stream including encoded data of transmission video data obtained by performing photoelectric conversion on input video data having a level range of 0% to 100%*N (N is a number larger than 1). A second transmission unit transmits a metafile including information for enabling a reception side to acquire the video stream. Further, information of an electro-optical conversion characteristic of each predetermined unit of the transmission video data is inserted into the video stream and/or the metafile.

As described above, in the present technology, the information of the electro-optical conversion characteristic of each predetermined unit of the transmission video data is inserted into the video stream and/or the metafile. Thus, it is possible to perform the photoelectric conversion on the HDR video data in predetermined units by selectively applying the appropriate photoelectric conversion characteristic according to the image content and transmit the resulting data.

Further, another concept of the present technology lies in a transmission device, including:

a transmission unit that transmits a container including a video stream including encoded data of transmission video data obtained by performing photoelectric conversion on input video data having a level range of 0% to 100%*N (N is a number larger than 1), wherein information of an electro-optical conversion characteristic of each predetermined unit of the transmission video data is inserted into a layer of the video stream and/or a layer of the container.

Effects of the Invention

According to the present technology, it is possible to perform appropriate photoelectric conversion on HDR video data according to image content and transmit resulting data. The effect described herein is merely an example and not limited, and an additional effect may be included.

BRIEF DESCRIPTION OF DRAWINGS

FIG. 3 is a diagram illustrating an example of photoelectric conversion characteristic.

FIG. 4 is a diagram illustrating a first access unit of a GOP when an encoding scheme is HEVC.

FIGS. 5(a) and 5(b) are diagrams illustrating an exemplary structure an HDR EOTF information SEI message.

FIG. 6 is a diagram illustrating an exemplary structure of "HDR_EOTF information_data( )."

FIG. 7 is a diagram illustrating main content in an exemplary structure of "HDR_EOTF information_data( )."

FIG. 8 is a diagram illustrating an exemplary structure of an HDR descriptor.

FIG. 11 is a diagram illustrating an exemplary structure of a packet of an HDMI Vendor Specific InfoFrame.

FIG. 12 is a diagram illustrating an exemplary structure of a packet of an HDMI Vendor Specific InfoFrame.

FIG. 19 is a diagram for describing a scheme that is newly defined.

FIG. 20 is a diagram illustrating an exemplary description of an MPD file of electro-optical conversion characteristic information.

FIG. 22 is a block diagram illustrating another exemplary configuration of an MPEG-DASH-based transceiving system.

MODE FOR CARRYING OUT THE INVENTION

Hereinafter, modes (hereinafter, referred to as "embodiments") for carrying out the invention will be described. The description will proceed in the following order.
1. Embodiment
2. Modified example 1. Embodiment

[Configuration of Transceiving System]

Figure 1:
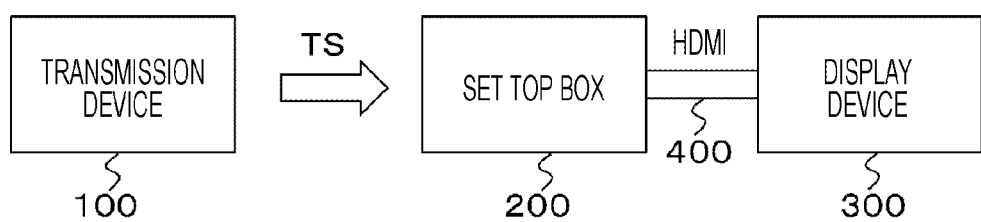
FIG. 1 is a block diagram illustrating an exemplary configuration of a transceiving system.

FIG. 1 illustrates an exemplary configuration of a transceiving system 10 according to an embodiment. The transceiving system 10 includes a transmission device 100, a set top box (STB) 200, and a display device (monitor) 300. The set top box 200 and the display device 300 are connected to each other via a high definition multimedia interface (HDMI) cable 400.

The transmission device 100 generates a transport stream TS of MPEG 2 serving as a container and transmits the transport stream TS through a broadcast wave or a network packet. The transport stream TS includes a video stream obtained by encoding transmission video data.

The transmission video data is obtained by selectively applying an appropriate photoelectric conversion characteristic to HDR video data serving as input video data according to image content in predetermined units and performing photoelectric conversion. In this case, for example, the input video data has a level range of 0% to N % (N>100), whereas the transmission video data has a level range of 0% to 100%. Here, a value of "%" is a relative value, for example, when 100 cd/m² is set as 100%. The predetermined unit is a scene unit, a program unit, or the like.

The transmission device 100 inserts information of electro-optical conversion characteristic of each predetermined unit of the transmission video data into a layer of the video stream and/or a layer of the transport stream (container). The electro-optical conversion characteristic is generally an inverse characteristic of the photoelectric conversion characteristic but may not be necessarily a perfectly inverse characteristic. Here, the information of the electro-optical conversion characteristic is, for example, type information designating a type of electro-optical conversion characteristic, a parameter for obtaining a curve of the electro-optical conversion characteristic, or the like.

The set top box 200 receives the transport stream TS that is transmitted through the broadcast wave or the network packet from the transmission device 100. The transport stream TS includes the video stream obtained by encoding the transmission video data. The set top box 200 performs a decoding process on the video stream, and acquires the transmission video data.

The set top box 200 acquires the information of the electro-optical conversion characteristic of each predetermined unit of the transmission video data inserted into the layer of the video stream and/or the layer of the transport stream (container). The set top box 200 transmits the transmission video data with the electro-optical conversion characteristic information to the display device 300 in association with each other.

In this case, the set top box 200 transmits the transmission video data and the electro-optical conversion characteristic information to the display device 300 via the HDMI cable 400. In other words, the set top box 200 transmits the transmission video data via a TMDS channel, and inserts the electro-optical conversion characteristic information, for example, into a blanking period of the transmission video data and then transmits the resulting transmission video data.

The display device 300 receives the transmission video data and the electro-optical conversion characteristic information which is transmitted from the set top box 200 via the HDMI cable 400. The display device 300 obtains output video data by performing the electro-optical conversion on the transmission video data based on the information of the electro-optical conversion characteristic of each predetermined unit. Then, the display device 300 displays an HDR image based on the output video data through a display unit (a display).

In this case, when the electro-optical conversion characteristic information is the type information, the display device 300 performs the electro-optical conversion on the transmission video data based on the curve of the electro-optical conversion characteristic of the type designated by the type information. In this case, when the electro-optical conversion characteristic information is the parameter for obtaining the curve of the electro-optical conversion characteristic, the display device 300 performs the electro-optical conversion on the transmission video data based on the curve of the electro-optical conversion characteristic obtained by the parameter. In this case, for example, by obtaining it based on the parameter and maximum display level information, it is possible to limit the maximum level of the output video data to the maximum display level information.

[Configuration of Transmission Device]

Figure 2:
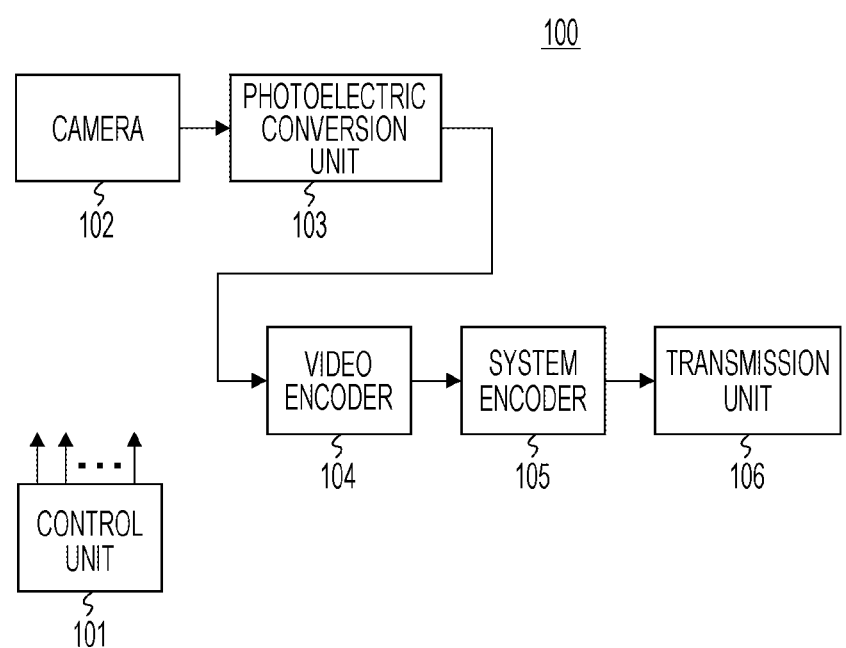
FIG. 2 is a block diagram illustrating an exemplary configuration of a transmission device.

FIG. 2 illustrates an exemplary configuration of the transmission device 100. The transmission device 100 includes a control unit 101, a camera 102, a photoelectric conversion unit 103, a video encoder 104, a system encoder 105, and a transmission unit 106. The control unit 101 is equipped with a central processing unit (CPU), and controls operations of the respective units of the transmission device 100 based on a control program stored in a storage (not illustrated).

The camera 102 images a subject, and outputs video data (HDR video data) of a high dynamic range (HDR) image. The video data has a level range of 0 to 100%*N such as 0 to 400% or 0 to 800%. Here, a level of 100% corresponds to a luminance value 100 cd/m² of white.

The photoelectric conversion unit 103 performs the photoelectric conversion on the HDR video data obtained by the camera 102 in predetermined units, for example, in units of scenes or in units of programs by selectively applying the electro-optical conversion characteristic according to the image content, and generates the transmission video data. Here, the photoelectric conversion characteristic to be applied may be selected automatically based on analysis of the image content or manually by an operation of the user. In this case, for example, when the input video data of the photoelectric conversion unit 103 is indicated by 12 or more bits, the transmission video data that has undergone the photoelectric conversion is indicated by 10 or less bits.

FIG. 3 illustrates an example of the photoelectric conversion characteristic. A curve of "HDR: Type 1" has a compatibility with a gamma characteristic of a legacy from 0 to S1. A curve of "HDR: Type 2" has a compatibility with the gamma characteristic of the legacy from 0 to S2. A curve of "HDR: Type 3" has a compatibility with the gamma characteristic of the legacy from 0 to S3. The photoelectric conversion characteristics that can be selected by the photoelectric conversion unit 103 are not limited to the three characteristics.

Referring back to FIG. 2, the video encoder 104 encodes the transmission video data generated by the photoelectric conversion unit 103, for example, according to MPEG4-AVC, MPEG 2 video, or high efficiency video coding (HEVC), and obtains encoded video data. The video encoder 104 generates a video stream (a video elementary stream) including the encoded video data through a stream formatter (not illustrated) arranged at a subsequent stage.

At this time, the video encoder 104 inserts the information of the electro-optical conversion characteristic of each predetermined unit of the transmission video data into the layer of the video stream. Generally, the electro-optical conversion characteristic information indicates the inverse characteristic of the photoelectric conversion characteristic applied by the photoelectric conversion unit 103 but may not be necessarily a perfectly inverse characteristic. For example, the electro-optical conversion characteristic information is the type information designating the type of the electro-optical conversion characteristic or the parameter for obtaining the curve of the electro-optical conversion characteristic. The video encoder 104 inserts the electro-optical conversion characteristic information, for example, in units of group of pictures (GOPs) serving as a display access unit including a predicted image.

The system encoder 105 generates the transport stream TS including the video stream generated by the video encoder 104. Then, the transmission unit 106 transmits the transport stream TS to the set-up box 200 through the broadcast wave or the network packet.

At this time, the system encoder 105 inserts the information of the electro-optical conversion characteristic of each predetermined unit of the transmission video data into the layer of the transport stream (container), similarly to the insertion into the layer of the video stream. In this case, the system encoder 105 inserts the electro-optical conversion characteristic information, for example, to be under a video elementary loop (Video ES loop) of a program map table (PMT) included in the transport stream TS.

An operation of the transmission device 100 illustrated in FIG. 2 will be briefly described. The video data (the HDR video data) of the HDR image obtained by the imaging of the camera 102 is supplied to the photoelectric conversion unit 103. The photoelectric conversion unit 103 performs the photoelectric conversion on the HDR video data in predetermined units, for example, in units of scenes or in units of programs by selectively applying the electro-optical conversion characteristic according to the image content, and generates the transmission video data.

The transmission video data generated by the photoelectric conversion unit 103 as described above is supplied to the video encoder 104. The video encoder 104 encodes the transmission video data, for example, according to the HEVC, and generates the video stream (the video elementary stream) including the encoded video data. At this time, the video encoder 104 inserts the information of the electro-optical conversion characteristic of each predetermined unit of the transmission video data into the layer of the video stream.

The video stream generated by the video encoder 104 is supplied to the system encoder 105. The system encoder 105 generates the transport stream TS of MPEG 2 including the video stream. At this time, the system encoder 105 inserts the information of the electro-optical conversion characteristic of each predetermined unit of the transmission video data into the layer of the transport stream (container), similarly to the insertion into the layer of the video stream. The transmission unit 106 transmits the transport stream TS to the set top box 200 through the broadcast wave or the network packet.

[Electro-Optical Conversion Characteristic Information and TS Configuration]

As described above, the electro-optical conversion characteristic information is inserted into the layer of the video stream. For example, when the encoding scheme is the HEVC, the electro-optical conversion characteristic information is inserted into a portion of "SEIs" of an access unit (AU) as an HDR EOTF information SEI message (HDR_EOTF_information SEI message).

FIG. 4 illustrates a first access unit of a group of picture (GOP) when the encoding scheme is the HEVC. In the case of the encoding scheme of the HEVC, an SEI message group "Prefix_SEIs" for decoding is arranged ahead of slices including encoded pixel data, and an SEI message group "Suffix_SEIs" for display is arranged behind the slices. The HDR EOTF information SEI message is arranged as the SEI message group "Suffix_SEIs."

FIG. 5(a) illustrates an exemplary structure (syntax) of "HDR_EOTF_information SEI message." "uuid_iso_iec_11578" has a UUID value described in "ISO/IEC 11578:1996 AnnexA." "HDR_ECTF information( )" is inserted into a field of "user_data_payload_byte." FIG. 5(b) illustrates an exemplary structure (syntax) of "HDR_EOTF information ( )," and "HDR_EOTF_information_data( )" serving as the electro-optical conversion characteristic information is inserted into "HDR_EOTF information( )." "user-data_id" is an identifier of the electro-optical conversion characteristic information indicated by 16 bits with no sign. An 8-bit field of "HDR_EOTF_information_length" indicates a byte length of "HDR_EOTF_information_data( )" after this field.

FIG. 6 illustrates an exemplary structure (syntax) of the electro-optical conversion characteristic information "HDR_EOTF information_data( )." FIG. 7 illustrates content (semantics) of the information in the exemplary structure illustrated in FIG. 6. A 16-bit field of "uncompressed_peak_level" is a percentage value (a relative value when 100 cd/m² is set as 100%) of a maximum level of source image data (the HDR video data). "eotf_flag" is a 1-bit flag information and indicates whether or not the electro-optical conversion characteristic information is the type information. "1" indicates that the electro-optical conversion characteristic information is the type information designating the type of the electro-optical conversion characteristic. "0" indicates that the electro-optical conversion characteristic information is the parameter for obtaining the curve of the electro-optical conversion characteristic.

There is an 8-bit field of "eotf_type" when "eotf_flag=1." Thus field indicates the type of the electro-optical conversion characteristic. On the other hand, when "eotf_flag=0," there is the following information. A 16-bit field of "compressed_peak_level" indicates a percentage value (a relative value to 100 cd/m²) of a maximum level of encoded image data (the transmission video data). An 8-bit field of "number_of_mapping_periods" indicates the number of linked level mapping curves.

A 16-bit field of "compressed_mapping_level" indicates a change position of the level mapping curve at a level compression axis using a percentage value in which "compressed_peak_level" is set to 100%. A 16-bit field of "uncompressed_mapping_level" indicates a change position of the level mapping curve at a level uncompression axis using a percentage value in which "uncompressed_peak_level" is set to 100%.

As described above, the electro-optical conversion characteristic information is inserted into the layer of the transport stream. In this embodiment, an HDR descriptor serving as a descriptor including the electro-optical conversion characteristic information is inserted, for example, to be under the program map table (PMT).

FIG. 8 illustrates an exemplary structure (syntax) of the HDR descriptor. Although a detailed description is omitted, the same information as the electro-optical conversion characteristic information "HDR_EOTF information_data( )" in the HDR EOTF information SEI message is included in the HDR descriptor. An 8-bit field of "HDR descriptor_tag" indicates a descriptor type and indicates that the descriptor is the HDR descriptor here. An 8-bit field of "HDR descriptor_length" indicates a length (size) of the descriptor, that is, indicates the number of subsequent bytes as the length of the descriptor.

Figure 9:
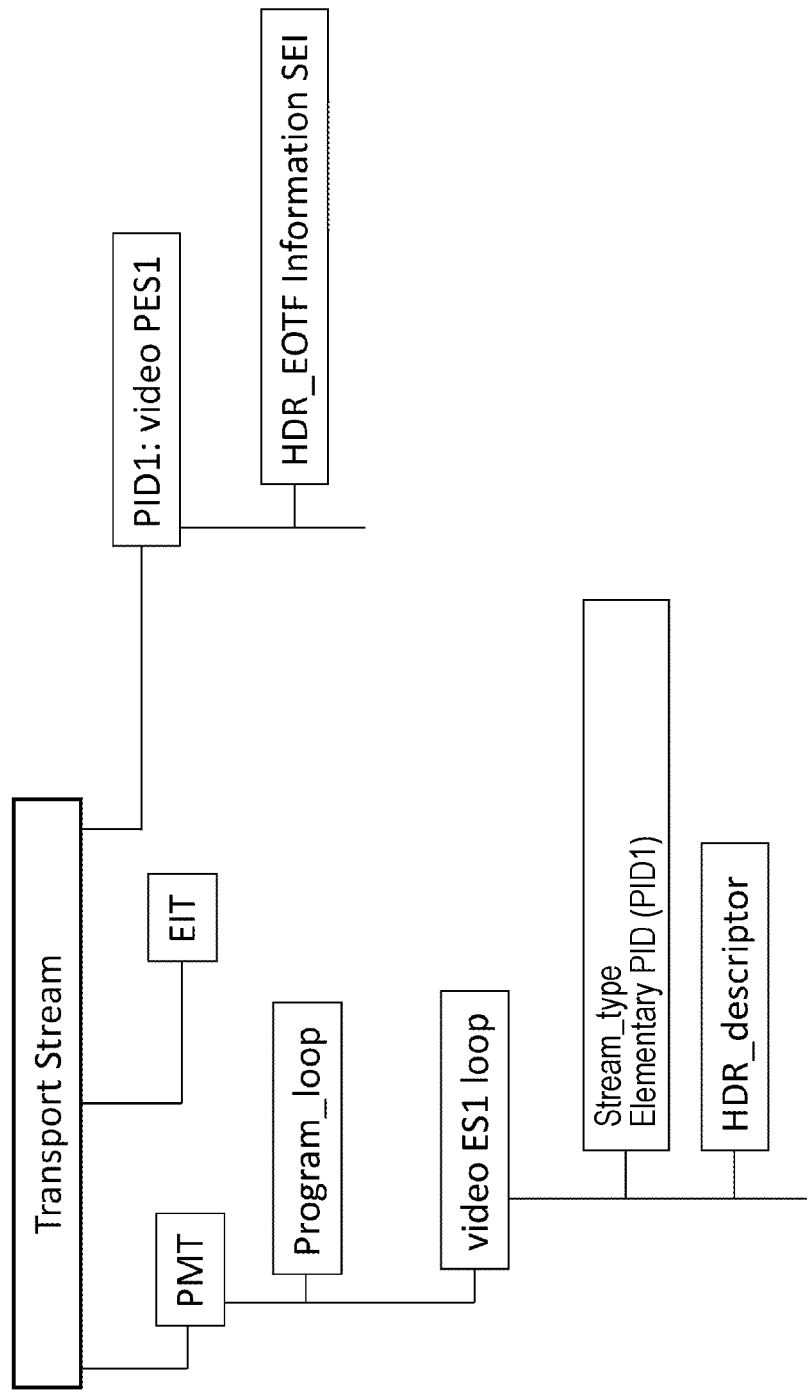
FIG. 9 is a diagram illustrating an exemplary configuration of a transport stream.

FIG. 9 illustrates an exemplary configuration of the transport stream TS. A PES packet "PID1: video PES1" of the video elementary stream is included in the transport stream TS. The HDR EOTF information SEI message (HDR_EOTF_information SEI message) is inserted into the video elementary stream.

The transport stream TS includes the program map table (PMT) as program specific information (PSI). The PSI is information describing a program associated with each elementary stream included in the transport stream. The transport stream TS includes an event information table (EIT) serving as serviced information (SI) for managing an event (program) unit.

The PMT includes an elementary loop having information associated with each elementary stream. In this exemplary configuration, a video elementary loop (Video ES loop) is included. Information such as a stream type and a packet identifier (PID) and a descriptor describing information associated with the video elementary stream are arranged in the video elementary loop in association with the video elementary stream. The HDR descriptor is arranged under the video elementary loop (Video ES loop) of the PMT.

[Configuration of Set-Up Box]

Figure 10:
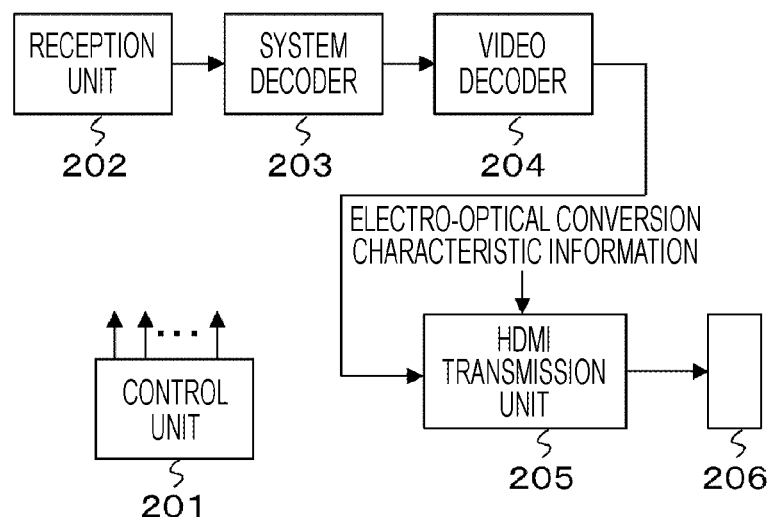
FIG. 10 is a block diagram illustrating an exemplary configuration of a set top box.

FIG. 10 illustrates an exemplary configuration of the set top box 200. The set top box 200 includes a control unit 201, a reception unit 202, a system decoder 203, a video decoder 204, a high-definition multimedia interface (HDMI) transmission unit 205, and an HDMI terminal 206. The "HDMI" is a registered trademark.

The control unit 201 is equipped with a central processing unit (CPU), and controls operations of the respective units of the set top box 200 based on a control program stored in a storage (not illustrated).

The reception unit 202 receives the transport stream TS transmitted from the transmission device 100 through the broadcast wave or the network packet. The system decoder 203 extracts the video stream (the elementary stream) from the transport stream TS. The system decoder 203 extracts various information inserted into the layer of the transport stream TS as described above, and transfers the extracted information to the control unit 201. The information also includes the HDR descriptor with the electro-optical conversion characteristic information.

The video decoder 204 performs a decoding process on the video stream extracted by the system decoder 203, and acquires the transmission video data (baseband video data). The video decoder 204 extracts an SEI message inserted into the video stream, and transfers the extracted SEI message to the control unit 201. The SEI message includes the HDR EOTF information SEI message with the electro-optical conversion characteristic information.

The HDMI transmission unit 205 transmits the transmission video data acquired by the video decoder 204 to an HDMI sink device, that is, the display device 300 in this embodiment through the HDMI terminal 206 using communication complying with the HDMI. The HDMI transmission unit 205 transmits the electro-optical conversion characteristic information of each predetermined unit (for example, a scene unit, a program unit, or the like) of the transmission video data given from the control unit 201 to the display device 300 in association with the transmission video data.

In this case, for example, the electro-optical conversion characteristic information is inserted into the blanking period of the transmission video data and transmitted in association with the transmission video data. A transmission method of the electro-optical conversion characteristic information is not limited to the method of inserting it into the blanking period as described above. For example, transmission using a CEC line or an HDMI Ethernet channel (HEC) is also considered.

When the electro-optical conversion characteristic information is inserted into the blanking period of the transmission video data and transmitted, a method of using an information packet arranged in the blanking period of the image data, for example, HDMI Vendor Specific InfoFrame (VS_Info) is considered.

FIG. 11 illustrates an exemplary packet structure of the HDMI Vendor Specific InfoFrame. The HDMI Vendor Specific InfoFrame is defined in CEA-861-D, and thus a detailed description thereof is omitted. The exemplary packet structure of FIG. 11 illustrates an example in which the electro-optical conversion characteristic information is the type information designating the type of the electro-optical conversion characteristic.

Flag information "Hdr_INFOFLAG" indicating whether or not the electro-optical conversion characteristic information is inserted is arranged in a 0th bit of a 5th byte (PB5). When the electro-optical conversion characteristic information is inserted, "Hdr_INFOFLAG=1" is set. Flag information "Eotf_flag" indicating whether or not the electro-optical conversion characteristic information is the type information is arranged in a 3rd bit of a 7th byte (PB7). In the case of the example of FIG. 11, "Eotf_flag=1" is set to indicate that the electro-optical conversion characteristic information is the type information.

When the electro-optical conversion characteristic information is the type information as described above, 16-bit information of "uncompressed_peak_level" is arranged in an 8th byte (PB8) and a 9th byte (PB9). In this case, upper 8 bits are arranged in the 8th byte, and lower 8 bits are arranged in the 9th byte. Further, 8-bit information of "eotf_type" is arranged in a 10th byte (PB10).

FIG. 12 illustrates an exemplary packet structure of the HDMI Vendor Specific InfoFrame. The exemplary packet structure of FIG. 12 illustrates an example in which the electro-optical conversion characteristic information is the parameter for obtaining the curve of the electro-optical conversion characteristic. In the case of this example, "Eotf_flag=0" is set to indicate that the electro-optical conversion characteristic information is the parameter.

When the electro-optical conversion characteristic information is the parameter as described above, 16-bit information of "uncompressed_peak_level" is arranged in an 8th byte (PB8) and a 9th byte (PB9). In this case, upper 8 bits are arranged in the 8th byte, and lower 8 bits are arranged in the 9th byte. 16-bit information of "compressed_peak_level" is arranged in a 10th byte (PB10) and an 11th byte (PB11). In this case, upper 8 bits are arranged in the 10th byte, and lower 8 bits are arranged in the 11th byte.

8-bit information of "number_of_mapping_periods" is arranged in a 12th byte (PB12). 16-bit information of "compressed_mapping_level" is arranged in a 13th byte (PB13) and a 14th byte (PB14). In this case, upper 8 bits are arranged in the 13th byte, and lower 8 bits are arranged in the 14th byte. 16-bit information of "uncompressed_mapping_level" is arranged in a 15th byte (PB15) and a 16th byte (PB16). In this case, upper 8 bits are arranged in the 15th byte, and lower 8 bits are arranged in the 16th byte. Subsequently, the same informations that in the 13th to 16th bytes is arranged repeatedly by "number_of_mapping_periods."

[Configuration of Display Device]

Figure 13:
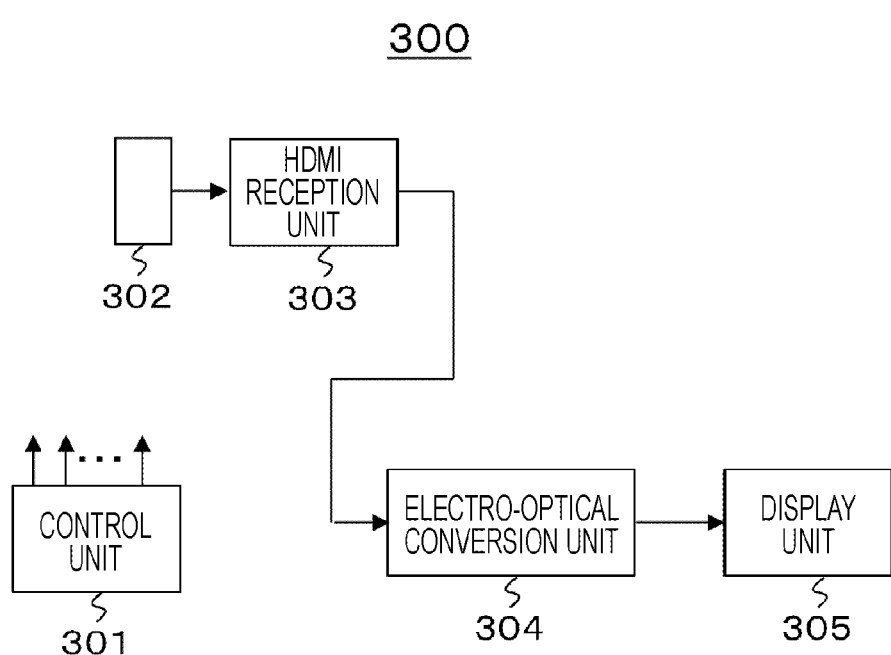
FIG. 13 is a diagram illustrating an exemplary configuration of a display device.

FIG. 13 illustrates an exemplary configuration of the display device 300. The display device 300 includes a control unit 301, an HDMI terminal 302, an HDMI reception unit 303, an electro-optical conversion unit 304, and a display unit 305. The control unit 301 is equipped with a central processing unit (CPU), and controls operations of the respective units of the display device 300 based on a control program stored in a storage (not illustrated).

The HDMI reception unit 303 receives the transmission video data and the electro-optical conversion characteristic information of each predetermined unit (for example, a scene unit, a program unit, or the like) of the transmission video data through the HDMI terminal 302 from an HDMI source device, that is, the set top box 200 in this embodiment using communication complying with the HDMI. The HDMI reception unit 303 transfers the received electro-optical conversion characteristic information to the control unit 301.

The electro-optical conversion unit 304 performs the electro-optical conversion on the transmission video data received by the HDMI reception unit 303 based on the information of the electro-optical conversion characteristic of each predetermined unit given from the control unit 301, and obtains the output video data. The display unit 305 displays the HDR image based on the output video data. In this case, for example, when the input video data of the electro-optical conversion unit 304 is indicated by 10 or less bits, the output video data of the electro-optical conversion unit 304 is indicated by 12 or more bits.

Figure 14:
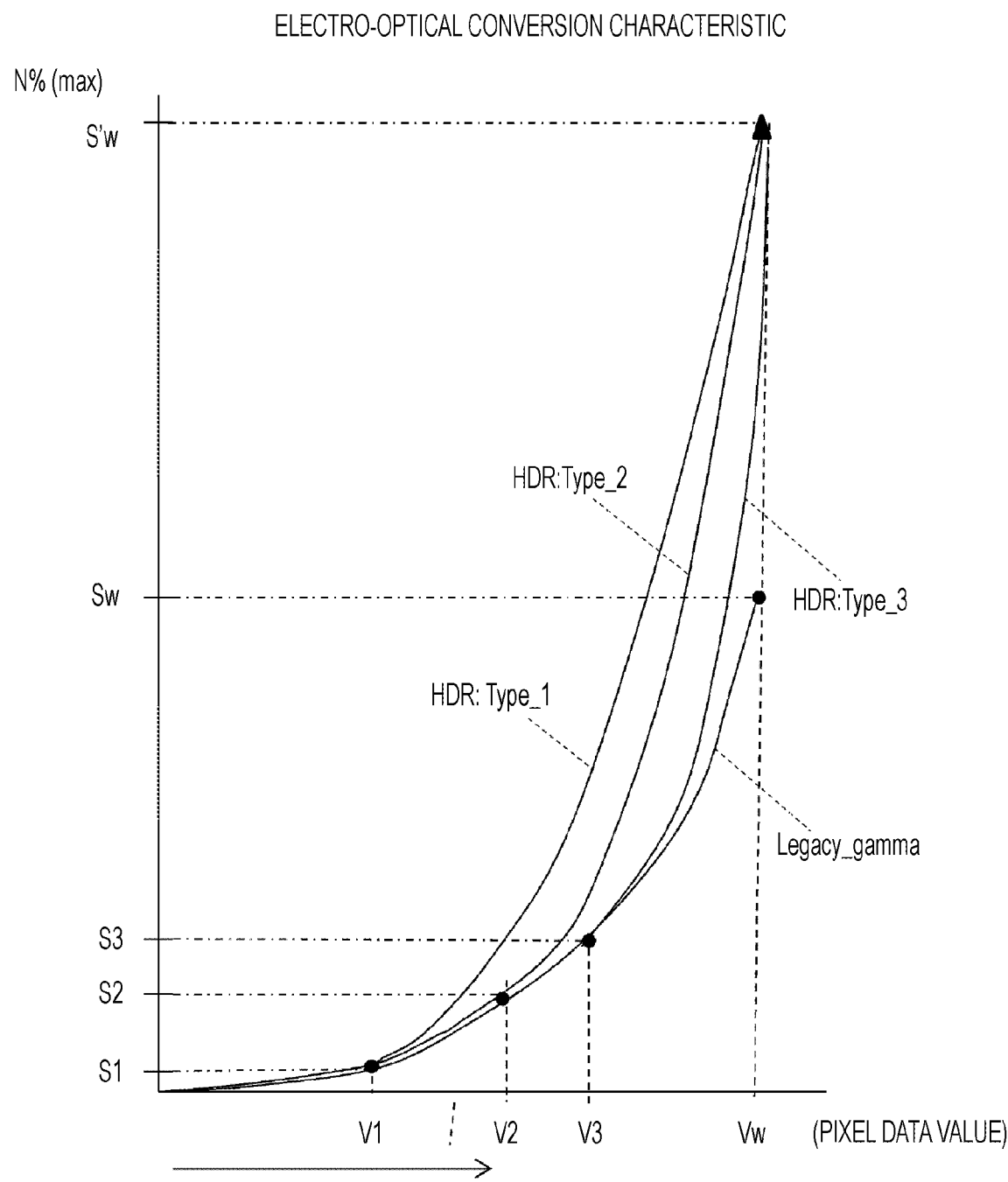
FIG. 14 is a diagram illustrating an example of an electro-optical conversion characteristic.

When the electro-optical conversion characteristic information is the type information, the electro-optical conversion unit 304 performs the electro-optical conversion on the transmission video data based on the curve of the electro-optical conversion characteristic of the type designated by the type information. FIG. 14 illustrates an example of the electro-optical conversion characteristic. A curve of "HDR: Type 1" has a compatibility with the gamma characteristic of the legacy from 0 to V1. A curve of "HDR: Type 2" has a compatibility with the gamma characteristic of the legacy from 0 to V2. A curve of "HDR: Type 3" has a compatibility with the gamma characteristic of the legacy from 0 to V3. The photoelectric conversion characteristics that can be selected by the electro-optical conversion unit 304 are not limited to the three characteristics.

Further, when the information of the electro-optical conversion characteristic is the parameter for obtaining the curve of the electro-optical conversion characteristic, the electro-optical conversion unit 304 performs the electro-optical conversion on the transmission video data based on the curve of the electro-optical conversion characteristic obtained by the parameter. In this case, since coordinates data of a change position of the linked level mapping curve is given as the parameter, the curve of the electro-optical conversion characteristic is obtained to pass through a coordinate position thereof or a position adjacent thereto. Then, the electro-optical conversion unit 304 performs the electro-optical conversion based on the curve of the electro-optical conversion characteristic.

Figure 15:
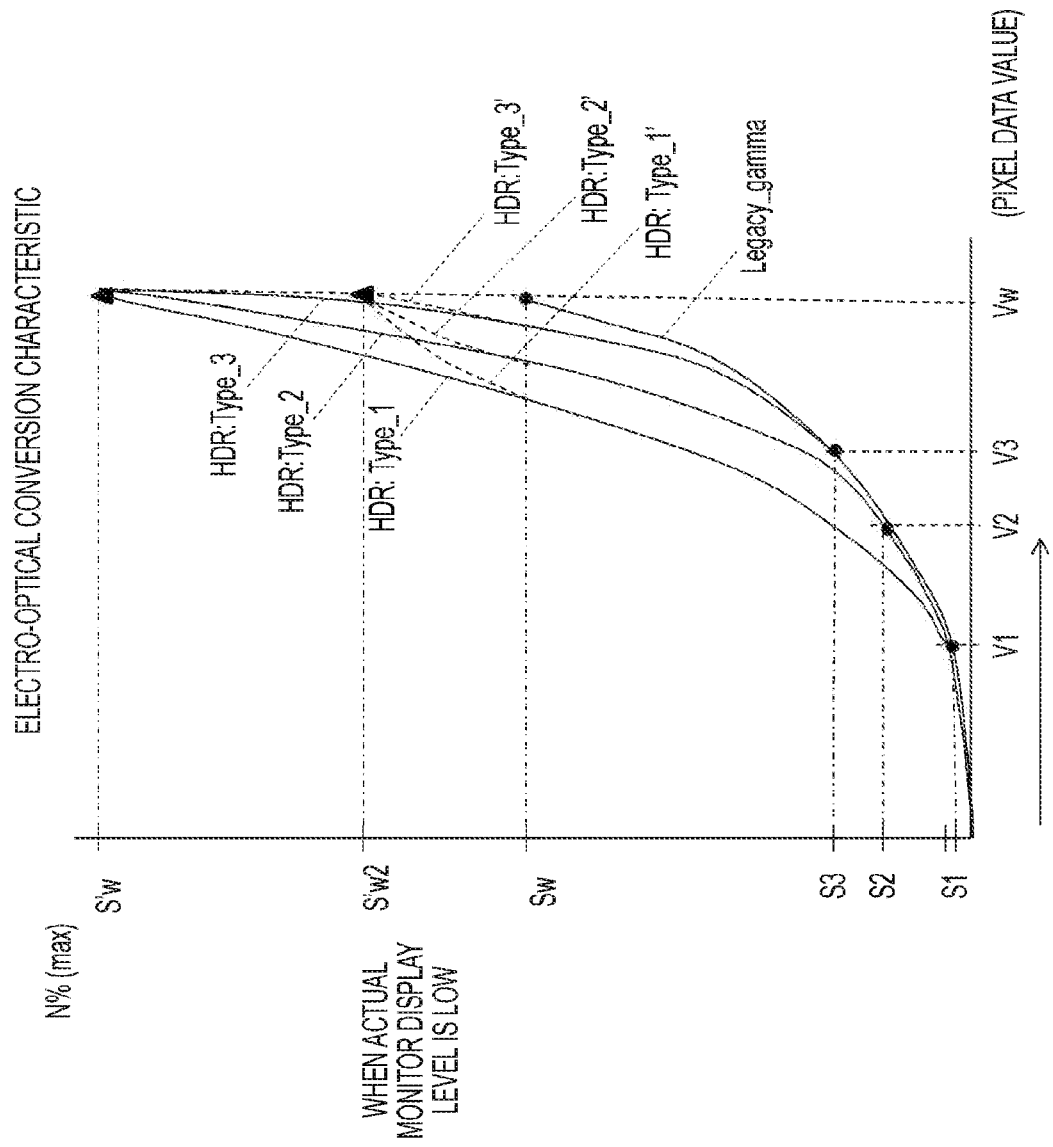
FIG. 15 is a diagram illustrating an example of an electro-optical conversion characteristic.

When the curve of the electro-optical conversion characteristic is obtained using the parameter as described above, by obtaining the curve of the electro-optical conversion characteristic based on the parameter and the maximum display level information, it is possible to limit the maximum level of the output video data to the maximum display level information. FIG. 15 illustrates an example of the electro-optical conversion characteristic. Both a curve of "HDR: Type 1" and a curve of "HDR: Type 1'" have a compatibility with the gamma characteristic of the legacy from 0 to V1, and a maximum level of the curve of "HDR: Type 1" is S'w, whereas a maximum level of the curve of "HDR: Type 1'" is limited to S'w2 serving as a maximum display level.

Both a curve of "HDR: Type 2" and a curve of "HDR: Type 2'" have a compatibility with the gamma characteristic of the legacy from 0 to V2, and a maximum level of the curve of "HDR: Type 2" is S'w, whereas a maximum level of the curve of "HDR: Type 2'" is limited to S'w2 serving as the maximum display level. Both a curve of "HDR: Type 3" and a curve of "HDR: Type 3'" have a compatibility with the gamma characteristic of the legacy from 0 to V3, and a maximum level of the curve of "HDR: Type 3" is S'w, whereas a maximum level of the curve of "HDR: Type 3'" is limited to S'w2 serving as the maximum display level.

An operation of the display device 300 illustrated in FIG. 13 will be briefly described. The HDMI reception unit 303 receives the transmission video data and the electro-optical conversion characteristic information of each predetermined unit (for example, a scene unit, a program unit, or the like) of the transmission video data from the set top box 200 through the HDMI terminal 302. The electro-optical conversion characteristic information is transferred to the control unit 301. The transmission video data is supplied to the electro-optical conversion unit 304.

The electro-optical conversion unit 304 performs the electro-optical conversion based on the information of the electro-optical conversion characteristic of each predetermined unit given from the control-unit 301, and obtains the output video data. In this case, when the electro-optical conversion characteristic information is the type information, the electro-optical conversion is performed on the transmission video data based on the curve of the electro-optical conversion characteristic of the type designated by the type information. In this case, when the optical conversion characteristic information is the parameter for obtaining the curve of the electro-optical conversion characteristic, the electro-optical conversion is performed on the transmission video data based on the curve of the electro-optical conversion characteristic obtained by the parameter.

The transmission video data obtained by the electro-optical conversion unit 304 is supplied to the display unit 305. The HDR image based on the output video data is displayed on the display unit 305.

As described above, in the transceiving system 10 illustrated in FIG. 1, the transmission device 100 inserts the information of the electro-optical conversion characteristic of each predetermined unit of the transmission video data into the layer of the video stream and the layer of the container. Thus, it is possible to perform the photoelectric conversion on the HDR video data in predetermined units by selectively the appropriate photoelectric conversion characteristic according to the image content and transmit the resulting data.

Further, in the transceiving system 10 illustrated in FIG. 1, the display device 300 performs the electro-optical conversion on the transmission video data received from the set top box 200 based on the information of the electro-optical conversion characteristic of each predetermined unit of the transmission video data, and obtains the output video data. Thus, it is possible to reproduce the HDR video data that does not undergo the photoelectric conversion in the transmission device 100 and displays the HDR image excellently.

Further, in the transceiving system 10 illustrated in FIG. 1, when the electro-optical conversion characteristic information is the parameter for obtaining the curve of the electro-optical conversion characteristic, the display device 300 can obtain the curve of the electro-optical conversion characteristic based on the parameter and the maximum display level information and limit the maximum level of the output video data received from the electro-optical conversion unit 304 to the maximum display level information. Thus, it is possible to display the HDR image excellently without incurring white collapse and the like in the display unit (display) 305.

Further, in the transceiving system 10 illustrated in FIG. 1, the set top box 200 inserts the electro-optical conversion characteristic information of each predetermined unit of the transmission video data into the blanking period of the transmission video data, and transmits the resulting data to the display device 300. Thus, it is possible to easily transmit the electro-optical conversion characteristic information in association with the transmission video data.

2. Modified Example

The above embodiment has been described in connection with the example in which the electro-optical conversion characteristic information is inserted into the layer of the video stream and the layer of the transport stream (container), but the electro-optical conversion characteristic information may be inserted into any one of the layer of the video stream and the layer of the transport stream (container). Further, a series of percentage values are dealt as a relative value to a reference when the brightness 100 cd/m$^2$ is set as 100%, but the relative value may not be necessarily fixed thereto. 100% of the reference may be set to brightness other than 100 cd/m$^2$. In this case, an association between a value of cd/m2 and a percentage is separately necessary.

Figure 16:
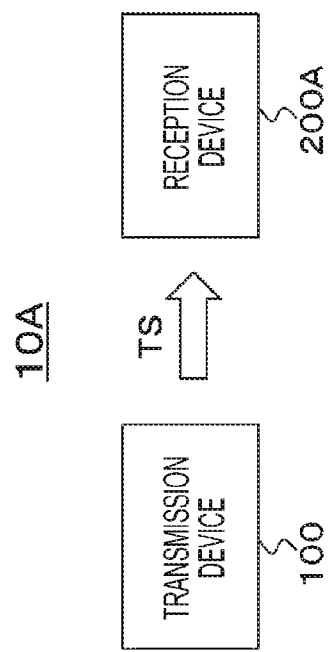
FIG. 16 is a block diagram illustrating another exemplary configuration of a transceiving system.

In the above embodiment, the transceiving system 10 is configured with the transmission device 100, the set top box 200, and the display device 300. However, a transceiving system 10A is also considered to be configured with a transmission device 100 and a reception device 200A equipped with a display unit as illustrated in FIG. 16.

Figure 17:
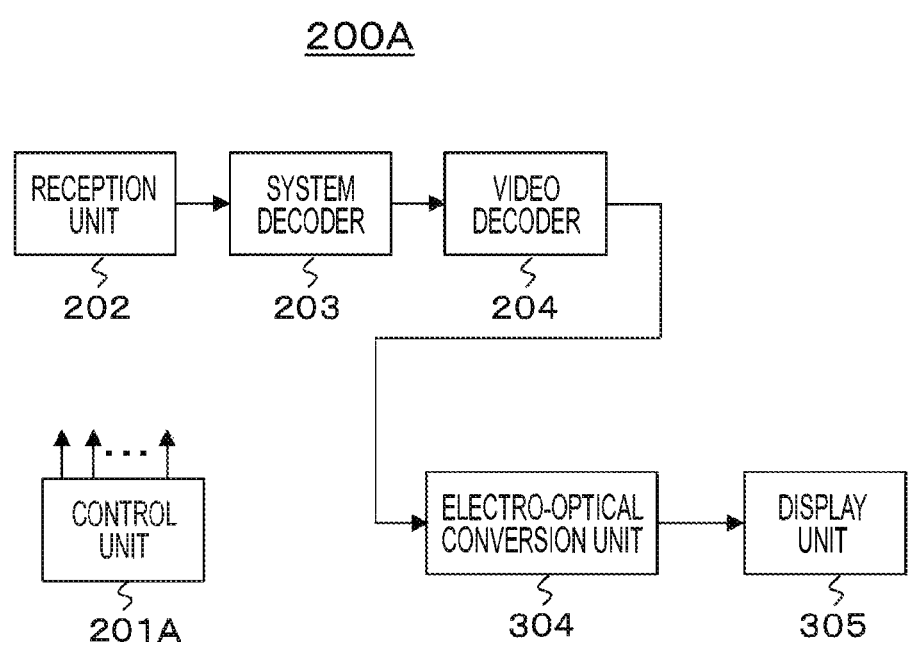
FIG. 17 is a block diagram illustrating an exemplary configuration of a reception device.

FIG. 17 illustrates an exemplary configuration of the reception device 200A. In FIG. 17, components corresponding to those in FIGS. 10 and 13 are denoted by the same reference numerals, and a detailed description thereof will be appropriately omitted. The reception device 200A includes a control unit 201A, a reception unit 202, a system decoder 203, a video decoder 204, an electro-optical conversion unit 304, and a display unit 305. The electro-optical conversion unit 304 performs the electro-optical conversion on the transmission video data obtained by the video decoder 204 based on the information of the electro-optical conversion characteristic of each predetermined unit given from the control unit 201A, and obtains the output video data. The display unit 305 displays the HDR image based on the output video data.

In the above embodiment, the set top box 200 and the display device 300 are connected by the HDMI digital interface. However, even when the set top box 200 and the display device 300 are connected by a digital interface (which includes a wireless interface as well as a wired interface) similar to the HDMI digital interface, the present technology can be similarly applied.

[MPEG-DASH-Based Transceiving System]

Figure 18:
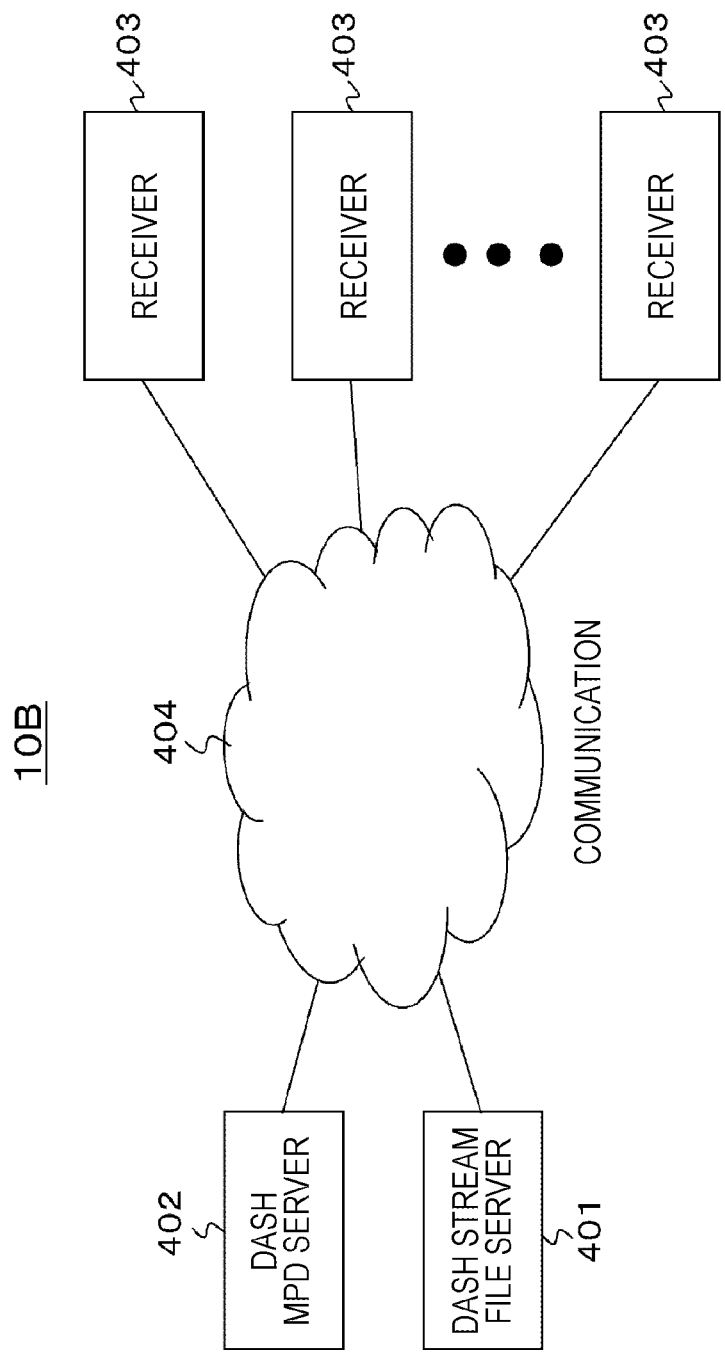
FIG. 18 is a block diagram illustrating an exemplary configuration of an MPEG-DASH-based transceiving system.

The present technology can be also applied to an MPEG-DASH-based transceiving system. FIG. 18 illustrates an exemplary configuration of an MPEG-DASH-based transceiving system 10B. The transceiving system 10B is configured such that N receivers 403 are connected to a DASH stream file server 401 and a DASH MPD server 402 via a network 404 such as the Internet.

The DASH stream file server 401 generates a stream segment (hereinafter, referred to appropriately as a "DASH segment") of a DASH specification based on media data (video data, audio data, subtitle data, or the like) of predetermined content, and transmits a segment of a predetermined stream to the receiver 403 of a request source according to a request made from the receiver 403.

The DASH MPD server 402 generates an MPD file for acquiring the DASH segment generated in the DASH stream file server 401. The DASH MPD server 402 generates the MPD file based on content metadata received from a content management server (not illustrated) and an address (url) of the segment generated in the DASH stream file server 401. The DASH MPD server 402 transmits the MPD file to the receiver 403 of the request source according to the request made from the receiver 403.

In an MPD format, an adaptation set describing encoding-related information of video or an audio is defined for each stream of video or an audio, and each attribute is described thereunder. For example, when video data included in the DASH segment corresponds to encoded data of the transmission video data in the above embodiment, and is data obtained by performing the photoelectric conversion on the HDR video data in predetermined units (for example, in units of scenes or in units of programs) by selectively applying the photoelectric conversion characteristic according to the image content, the information of the electro-optical conversion characteristic corresponding to the photoelectric conversion characteristic is described in the MPD file. It corresponds to the insertion of the HDR descriptor into the layer of the transport stream TS in the above embodiment.

In this case, the information of the electro-optical conversion characteristic of each predetermined unit of the video data is inserted into the video data (the video stream) included in the DASH segment, similarly to the video stream in the above embodiment. For example, when the encoding scheme is the HEVC, the electro-optical conversion characteristic information is inserted into the portion of "SEIs" of the access unit (AU) as the HDR EOTF information SEI message (HDR_EOTF_information SEI message).

For example, a schema illustrated in FIG. 19 is newly defined in the MPD file to describe the electro-optical conversion characteristic information. "service_video:high_dynamic_range" indicates a video display is the high dynamic range (HDR). "0" indicates that the video display is not the HDR, and "1" the video display is the HDR.

"service_video:high_dynamic_range:eotf_compatible" indicates whether or not the electro-optical conversion characteristic has a compatibility with the gamma characteristic of the legacy. "0" indicates an HDR electro-optical conversion characteristic having a partial compatibility with the gamma characteristic of the legacy. "1" indicates an HDR electro-optical conversion characteristic having no compatibility with the gamma characteristic of the legacy. "2" indicates that it is the gamma characteristic of the legacy.

"service_video:high_dynamic_range:eotf_type" indicates a type of electro-optical conversion characteristic. "0" indicates "type_1," "1" indicates "type_2," and "2" indicates "type_3." "service_video:high_dynamic_range:compressed_peak_level" indicates a percentage value (a relative value when 100 cd//m2 is set, for example, as 100%) of the maximum level of the encoded image data (the transmission video data). "service_video:high_dynamic_range:number_of_mapping_periods" indicates the number of linked level mapping curves.

In "service_video:high_dynamic_range:compressed_mapping_level," the change position of the level mapping curve at the level compression axis is indicated by a percentage value in which "compressed_peak_level" is set to 100*. In "service_video:high_dynamic_range:uncompressed_mapping_level," the change position of the level mapping curve at the level uncompression axis is indicated by a percentage value in which "uncompressed_peak_level" is set to 100%.

FIG. 20 illustrates an exemplary description of the MPD file including the electro-optical conversion characteristic information. For example, the video display is understood to be the high dynamic range (HDR) from a describing of "service_video:high_dynamic_range<1>." For example, it is understood to be the HDR electro-optical conversion characteristic having a compatibility with the gamma characteristic of the legacy from a description of "service_video:high_dynamic_range<0>." For example, the type of the electro-optical conversion characteristic is understood to be "type_2" from a description of "service_video:high_dynamic_range:eotf_type<1>."

Figure 21:
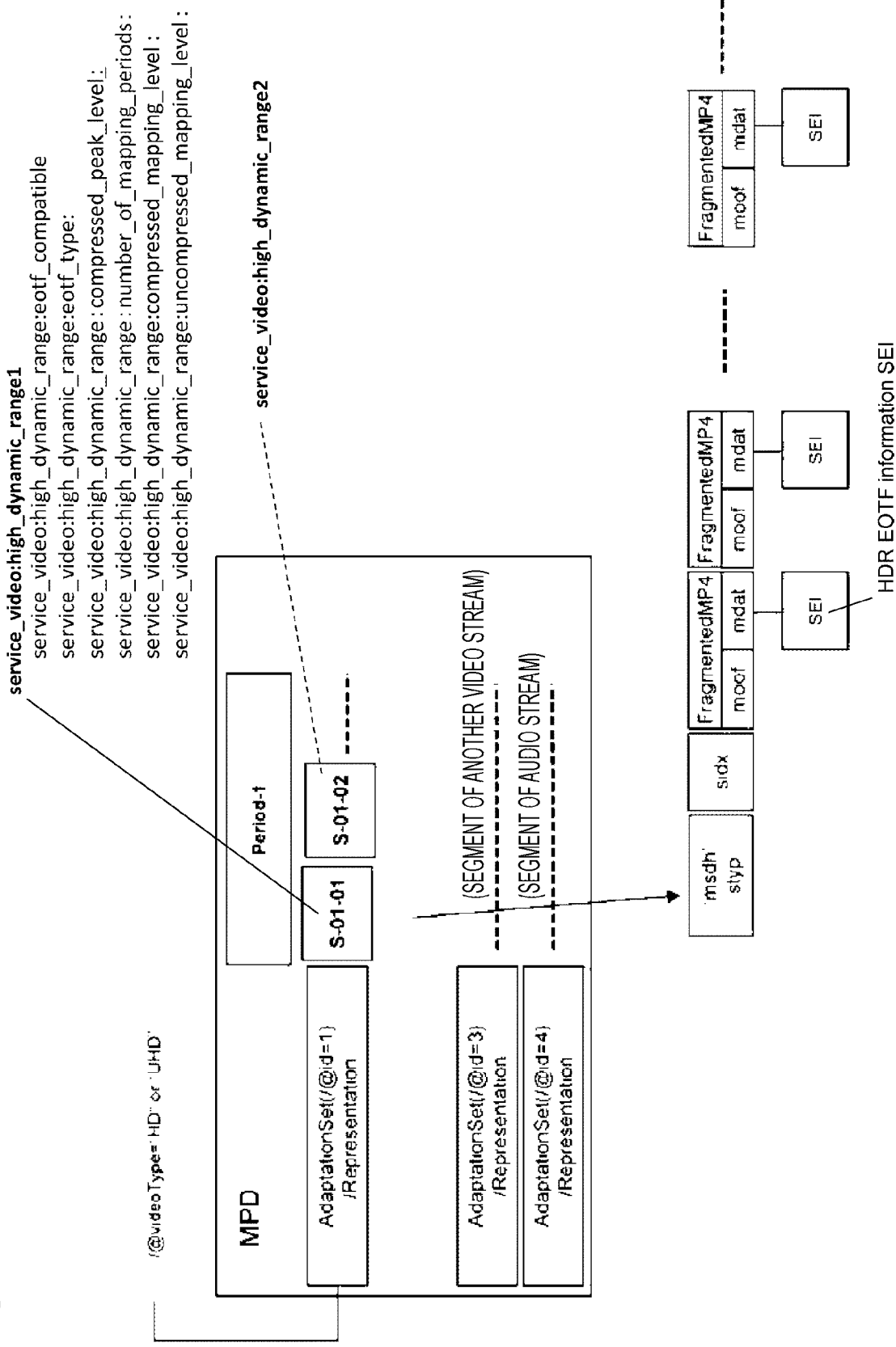
FIG. 21 is a diagram illustrating an exemplary configuration of a fragmented MP4 stream.

FIG. 21 illustrates an exemplary configuration of a fragmented MP4 stream. A fragmented MP4 stream of video includes Fragmented MP4 obtained by packetizing a video stream. A predetermined picture of the video stream is inserted into a portion of "mdat" of Fragmented MP4. Similarly to the above embodiment, for example, the HDR EOTF information SEI message (HDR_EOTF_information SEI message) is inserted into the video stream for each GOP.

Similarly to the above embodiment, the receiver 403 performs the electro-optical conversion on the received video data based on the electro-optical conversion characteristic information included in the HDR EOTF information SEI message or the electro-optical conversion characteristic information described in the MPD file. Thus, for example, it is possible to reproduce the HDR video data that does not undergo the photoelectric conversion at the transmission side and displays the HDR image excellently. Since the receiver 403 acquires the MPD file in advance, the receiver 403 can prepare characteristics of the electro-optical conversion unit in advance based on the electro-optical conversion characteristic information included in the MPD file as well.

The transceiving system 10B illustrated in FIG. 18 transmits a segment of a predetermined stream generated by the DASH stream file server 401 or the MPD file generated by the DASH MPD server 402 to the receiver 403 via the network 404. However, as illustrated in FIG. 22, it is similarly possible to configure a transceiving system 10C in which a segment of a predetermined stream generated by the DASH stream file server 401 or the MPD file generated by the DASH MPD server 402 is transmitted from a broadcasting station 405 to the receiver 403 through a broadcast wave.

The present technology may have the following configuration.

(1)

A transmission device, including:

a processing unit that performs photoelectric conversion on input video data having a level range of 0% to 100%*N (N is a number larger than 1), and obtains transmission video data;

a transmission unit that transmits a container including a video stream obtained by encoding the transmission video data; and an information insertion unit that inserts information of an electro-optical conversion characteristic of each predetermined unit of the transmission video data into a layer of the video stream and/or a layer of the container.

(2)

The transmission device according to (1), wherein the predetermined unit is a scene unit or a program unit.

(3)

The transmission device according to (1) or (2), wherein the electro-optical conversion characteristic information is type information designating a type of the electro-optical conversion characteristic.

(4)

The transmission device according to (1) or (2), wherein the electro-optical conversion characteristic information is a parameter for obtaining a curve of the electro-optical conversion characteristic.

(5)

A transmission method, including:

a processing step of performing photoelectric conversion on input video data having a level range of 0% to 100%*N (N is a number larger than 1) and obtaining transmission video data;

a transmission step of transmitting, by a transmission unit, a container including a video stream obtained by encoding the transmission video data; and an information insertion step of inserting information of an electro-optical conversion characteristic of each predetermined unit of the transmission video data into a layer of the video stream and/or a layer of the container.

(6)

A reception device, including:

a reception unit that receives a container of a predetermined format including a video stream obtained by encoding transmission video data, the transmission video data being obtained by performing photoelectric conversion on input video data having a level range of 0% to 100%*N (N is a number larger than 1), information of an electro-optical conversion characteristic of each predetermined unit of the transmission video data being inserted into a layer of the video stream and/or a layer of the container; and a processing unit that processes the video stream included in the container received by the reception unit.

(7)

The reception device according to (6), wherein the processing unit includes a decoding unit that decodes the video stream and obtains the transmission video data, and an electro-optical conversion unit that performs electro-optical conversion on the transmission video data obtained by the decoding unit based on information of the electro-optical conversion characteristic of each predetermined unit, and obtains output video data.

(8)

The reception device according to (7), wherein the electro-optical conversion characteristic information is type information designating a type of the electro-optical conversion characteristic, and the electro-optical conversion unit performs electro-optical conversion on the transmission video data based on a curve of the electro-optical conversion characteristic of the type designated by the type information.

(9)

The reception device according to (7), wherein the electro-optical conversion characteristic information is a parameter for obtaining a curve of the electro-optical conversion characteristic, and the electro-optical conversion unit performs electro-optical conversion on the transmission video data based on the curve of the electro-optical conversion characteristic obtained by the parameter.

(10)

The reception device according to (9), wherein the curve of the electro-optical conversion characteristic used by the electro-optical conversion unit is obtained based on the parameter and maximum display level information, and a maximum level of the output video data is limited to the maximum display level information.

(11)

The reception device according to (6), wherein the processing unit includes a decoding unit that decodes the video stream included in the container, and obtains the transmission video data, and a transmission unit that transmits the transmission video data obtained by the decoding unit and the electro-optical conversion characteristic information of each predetermined unit of the transmission video data to an external device in association with each other.

(12)

The reception device according to (11), wherein the transmission unit transmits the transmission video data to the external device through a differential signal using a predetermined number of channels, and inserts information of the electro-optical conversion characteristic into a blanking period of the transmission video data and transmits the electro-optical conversion characteristic information to the external device.

(13)

A reception method, including:

a reception step of receiving, by a reception unit, a container of a predetermined format including a video stream obtained by encoding transmission video data, the transmission video data being obtained by performing photoelectric conversion on input video data having a level range of 0% to 100%*N (N is a number larger than 1), information of an electro-optical conversion characteristic of each predetermined unit of the transmission video data being inserted into a layer of the video stream and/or a layer of the container; and a processing step of processing the video stream included in the container received in the reception step.

(14)

A display device, including:

a reception unit that receives transmission video data and information of an electro-optical conversion characteristic of each predetermined unit of the transmission video data associated with the transmission video data from an external device; and an electro-optical conversion unit that performs electro-optical conversion on the transmission video data received by the reception unit based on the information of the electro-optical conversion characteristic of each predetermined unit, and obtains output video data.

(15)

The display device according to (14), wherein the electro-optical conversion characteristic information is type information designating a type of the electro-optical conversion characteristic, and the electro-optical conversion unit performs electro-optical conversion on the transmission video data based on a curve of the electro-optical conversion characteristic of the type designated by the type information.

(16)

The display device according to (14), wherein the electro-optical conversion characteristic information is a parameter for obtaining a curve of the electro-optical conversion characteristic, and the electro-optical conversion unit performs electro-optical conversion on the transmission video data based on the curve of the electro-optical conversion characteristic obtained by the parameter.

(17)

The display device according to (16), wherein the curve of the electro-optical conversion characteristic used by the electro-optical conversion unit is obtained based on the parameter and maximum display level information, and a maximum level of the output video data is limited to the maximum display level information.

(18)

A display method, including:

a reception step of receiving, by a reception unit, transmission video data and information of an electro-optical conversion characteristic of each predetermined unit of the transmission video data associated with the transmission video data from an external device; and an electro-optical conversion step of performing electro-optical conversion on the transmission video data received in the reception step based on the information of the electro-optical conversion characteristic of each predetermined unit and obtaining output video data.

(19)

A transmission device, including:

a first transmission unit that transmits a container including a video stream including encoded data of transmission video data obtained by performing photoelectric conversion on input video data having a level range of 0% to 100%*N (N is a number larger than 1); and a second transmission unit that transmits a metafile including information for enabling a reception side to acquire the video stream, wherein information of an electro-optical conversion characteristic of each predetermined unit of the transmission video data is inserted into the video stream and/or the metafile.

(20)

A transmission device, including;

a transmission unit that transmits a container including a video stream including encoded data of transmission video data obtained by performing photoelectric conversion on input video data having a level range of 0% to 100%*N (N is a number larger than 1), wherein information of an electro-optical conversion characteristic of each predetermined unit of the transmission video data is inserted into a layer of the video stream and/or a layer of the container.

One of main features of the present technology lies in that information of an electro-optical conversion characteristic of each predetermined unit of transmission video data is inserted into a layer of a video stream or a layer of a container, and thus a transmission side can perform photoelectric conversion on HDR video data in predetermined units by selectively applying an appropriate photoelectric conversion characteristic according to image content (see FIG. 9).

REFERENCE SIGNS LIST 10, 10A to 10C Transceiving system
100 Transmission device
101 Control unit
102 Camera
103 Photoelectric conversion unit
104 Video encoder
105 System encoder
106 Transmission unit
200 Set lop box
200A Reception device
201, 201A Control unit
202 Reception unit
203 System decoder
204 Video decoder
205 HDMI transmission unit
206 HDMI terminal
300 Display device
301 Control unit
302 HDMI terminal
303 HDMI reception unit
304 Electro-optical conversion unit
305 Display unit
401 DASH stream file server
402 DASH MPD server
403 Receiver
404 Network
405 Broadcasting station

The invention claimed is:

1. A reception device, comprising:
a high definition multimedia interface configured to receive first video data of a first high dynamic range video and first characteristic information for an electro-optical conversion of the first video data, the first video data received by the high definition multimedia interface being uncompressed, the first video data being obtained by applying a photoelectric conversion characteristic to first high dynamic range video input data, the first characteristic information indicating a type for the electro-optical conversion of the first video data that corresponds to a high dynamic range curve, the high dynamic range curve including a first segment of a non-high dynamic range gamma curve and a second segment that diverges from the non-high dynamic range gamma curve;
reception circuitry configured to receive second video data of a second high dynamic range video and second characteristic information for electro-optical conversion of the second video data, the second video data received by the reception circuitry being compressed;
a video decoder configured to decode the compressed second video data received by the reception circuitry;
electro-optical conversion circuitry configured to convert the first video data based on the first characteristic information and the second video data based on the second characteristic information; and
a display configured to display HDR images based on the converted first video data and the converted second video data.

2. The reception device according to claim 1, wherein
the electro-optical conversion circuitry is configured to
convert the first video data based on the first characteristic information when the high definition multimedia interface receives the first video data, and
convert the second video data based on the second characteristic information when the reception circuitry receives the second video data; and
the display is configured to
display the HDR images based on the converted first video data when the high definition multimedia interface receives the first video data, and
display the HDR images based on the converted second video data when the reception circuitry receives the second video data.

3. The reception device according to claim 1, wherein the second video data is obtained by applying a photoelectric conversion characteristic to second high dynamic range video input data, the second characteristic information indicating a type for the electro-optical conversion of the second video data that corresponds to the high dynamic range curve.

4. A reception device, comprising:
circuitry configured to
receive first video data of a first high dynamic range video and first characteristic information for an electro-optical conversion of the first video data via a high definition multimedia interface, the first video data received via the high definition multimedia interface being uncompressed, the first video data being obtained by applying a photoelectric conversion characteristic to first high dynamic range video input data, the first characteristic information indicating a type for the electro-optical conversion of the first video data that corresponds to a high dynamic range curve, the high dynamic range curve including a first segment of a non-high dynamic range gamma curve and a second segment that diverges from the non-high dynamic range gamma curve;
receive second video data of a second high dynamic range video and second characteristic information for electro-optical conversion of the second video data via reception circuitry, the second video data received via the reception circuitry being compressed; and
process the first video data based on the first characteristic information and the second video data based on the second characteristic information.

5. The reception device according to claim 4, wherein the circuitry is configured to
process the first video data based on the first characteristic information when the first video data is received via the high definition multimedia interface, and
process the second video data based on the second characteristic information when the second video data is received via the reception circuitry.

6. The reception device according to claim 4, wherein the second video data is obtained by applying a photoelectric conversion characteristic to second high dynamic range video input data, the second characteristic information indicating a type for the electro-optical conversion of the second video data that corresponds to the high dynamic range curve.

7. The reception device according to claim 4, wherein the non-high dynamic range gamma curve corresponds to a standard dynamic range.

8. The reception device according to claim 4, wherein the circuitry is configured to convert the first video data based on the type for the electro-optical conversion of the first video data.

9. The reception device according to claim 7, wherein the circuitry is configured to convert the first video data based on the type for the electro-optical conversion of the first video data.

10. The reception device according to claim 4, wherein the reception device further comprises the high definition multimedia interface.

11. The reception device according to claim 4, wherein the reception device further comprises the reception circuitry.

12. The reception device according to claim 4, wherein the reception device further comprises a display configured to display HDR images based on the processed first video data and the processed second video data.

* * * * *